July 10, 1945.  E. WILDERSON  2,380,004
DUPLICATING APPARATUS
Filed Sept. 8, 1941   21 Sheets-Sheet 4

INVENTOR.
Eli Wilderson.
BY Zabel, Carlson, Gritzbaugh & Wells.
attys.

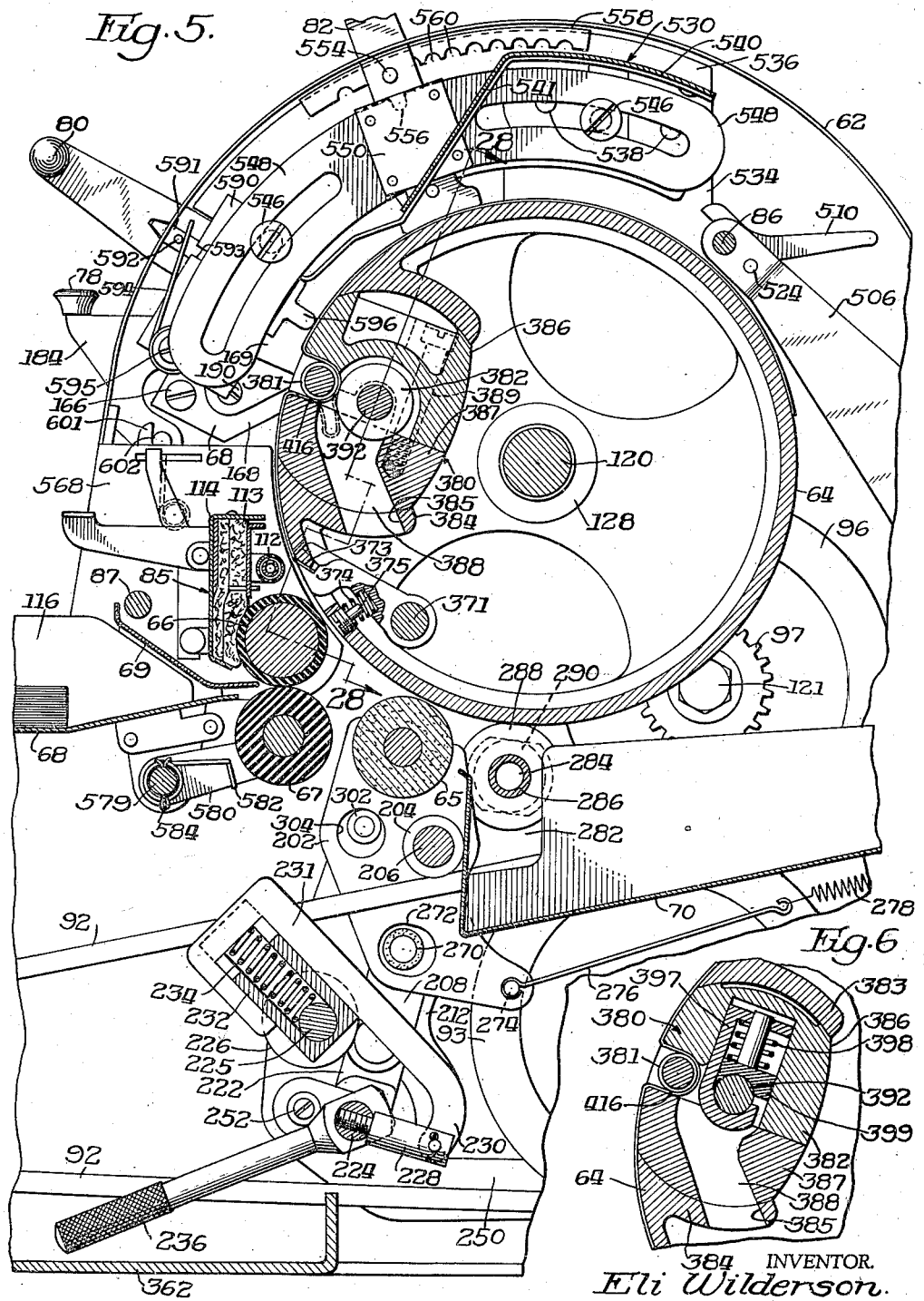

July 10, 1945.  E. WILDERSON  2,380,004
DUPLICATING APPARATUS
Filed Sept. 8, 1941   21 Sheets-Sheet 6

INVENTOR.
Eli Wilderson
BY Zabel, Carlson, Gritzbaugh & Wells
Attys

July 10, 1945.  E. WILDERSON  2,380,004
DUPLICATING APPARATUS
Filed Sept. 8, 1941  21 Sheets-Sheet 7

INVENTOR.
Eli Wilderson
BY Zabel Carlson Gritzbaugh & Wells
Attys

July 10, 1945.  E. WILDERSON  2,380,004
DUPLICATING APPARATUS
Filed Sept. 8, 1941   21 Sheets-Sheet 8
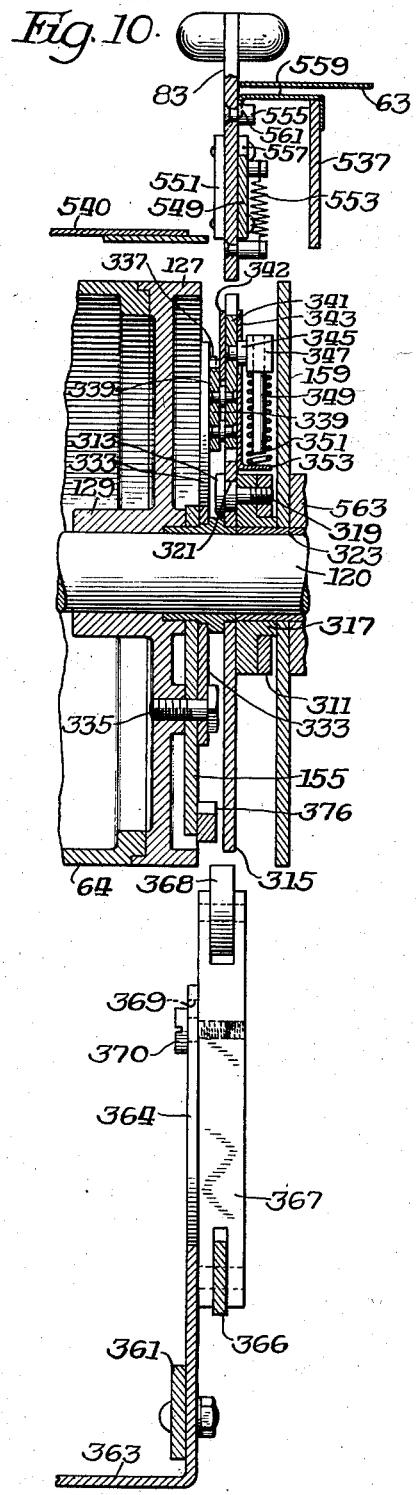
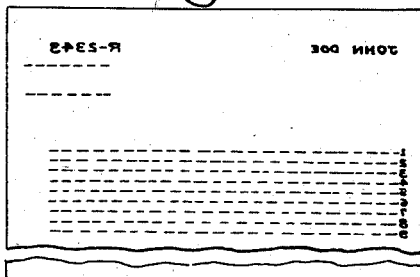
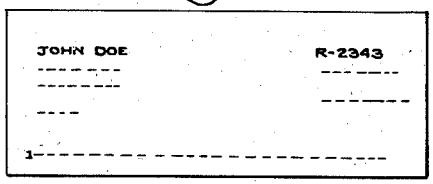
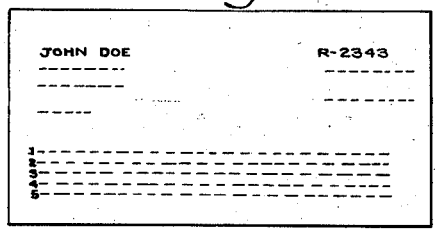
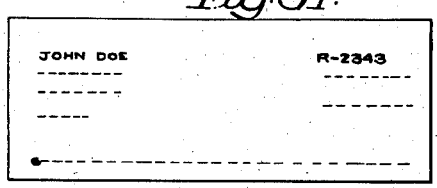
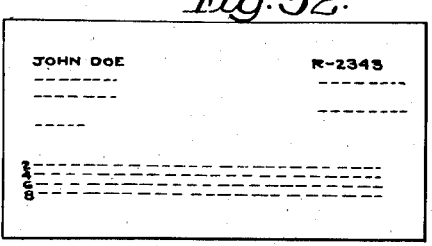
INVENTOR.
Eli Wilderson
BY Zabel, Carlson, Gritzbaugh & Wells
attys July 10, 1945.  E. WILDERSON  2,380,004
DUPLICATING APPARATUS
Filed Sept. 8, 1941   21 Sheets-Sheet 9

INVENTOR.
Eli Wilderson

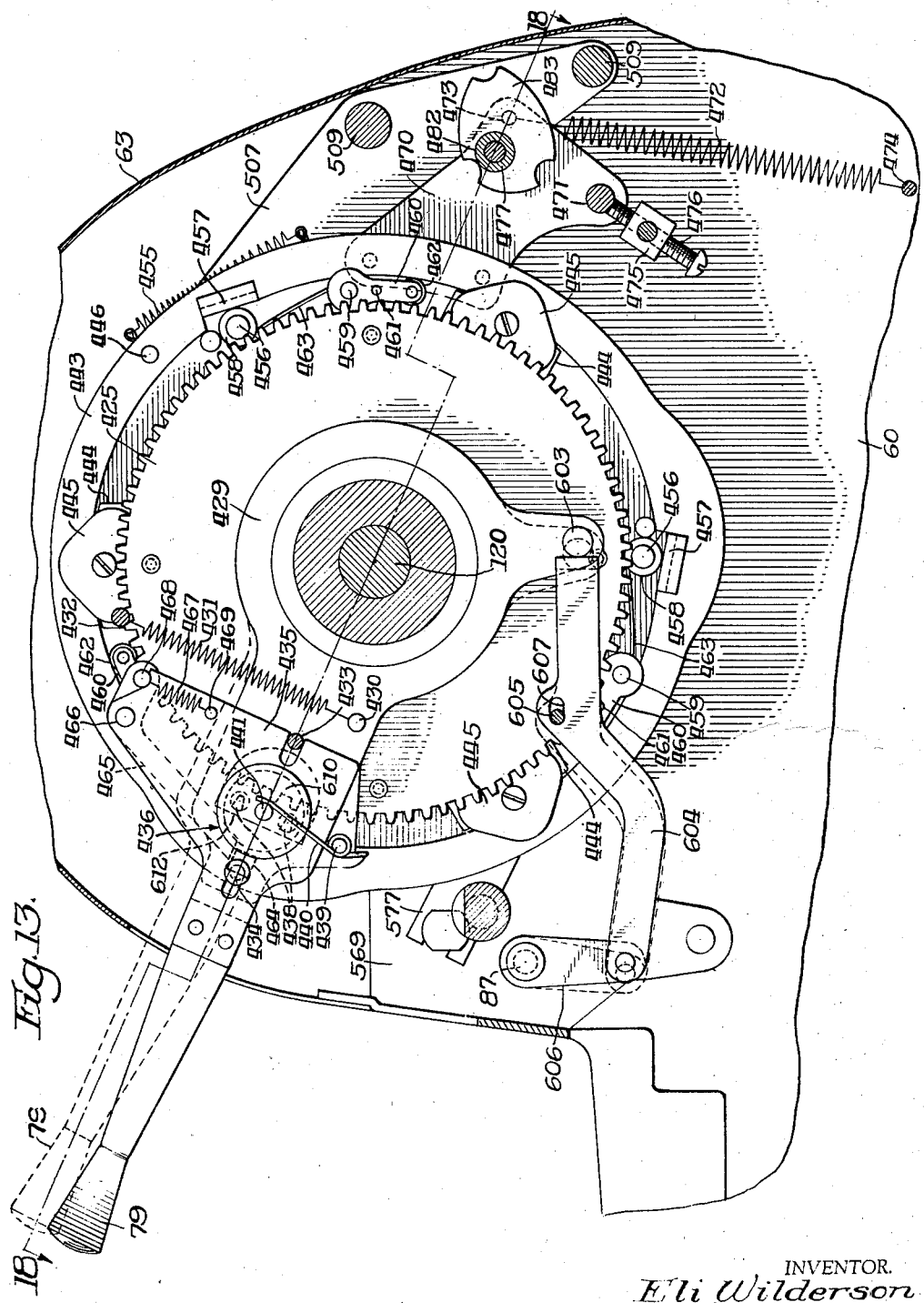

July 10, 1945.                    E. WILDERSON                    2,380,004
                              DUPLICATING APPARATUS
                        Filed Sept. 8, 1941        21 Sheets-Sheet 11
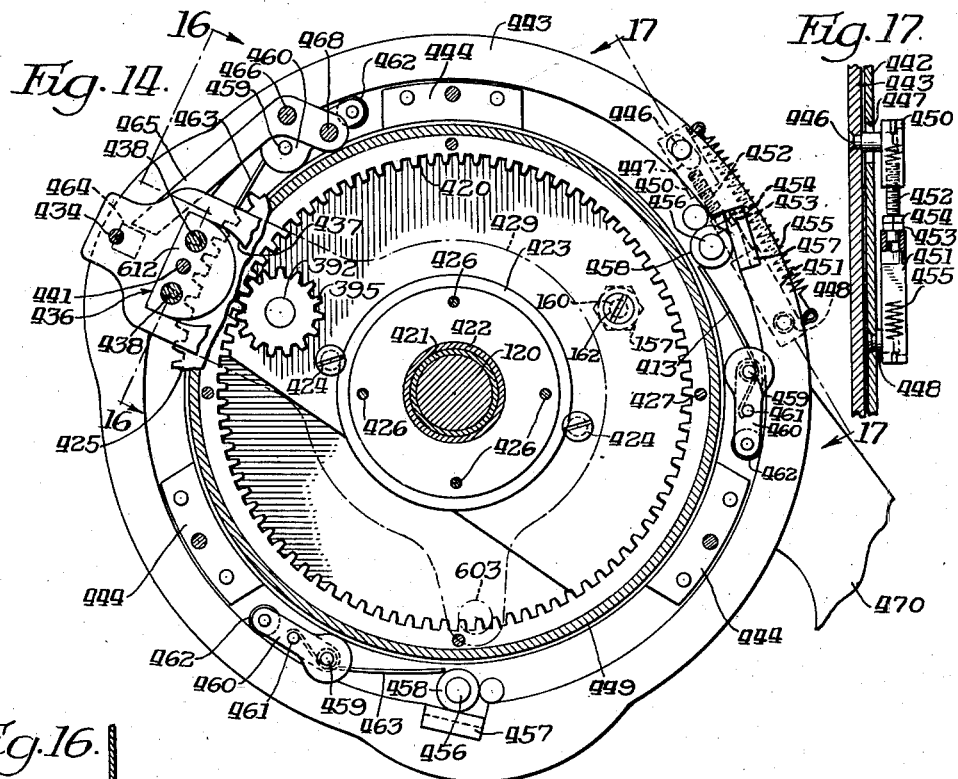
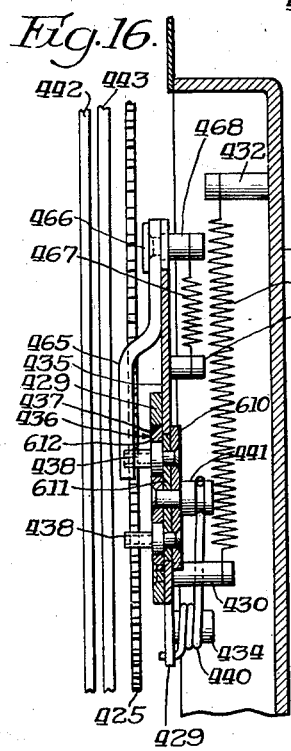
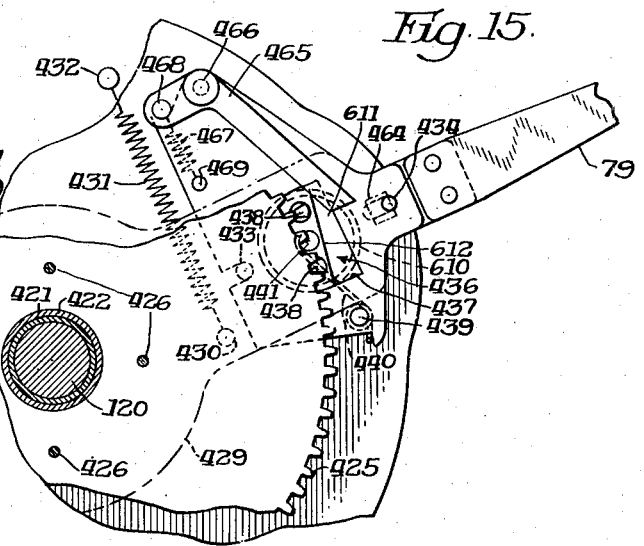
INVENTOR.
Eli Wilderson
BY
Zabel, Carlson, Gritzbaugh & Wells
attys

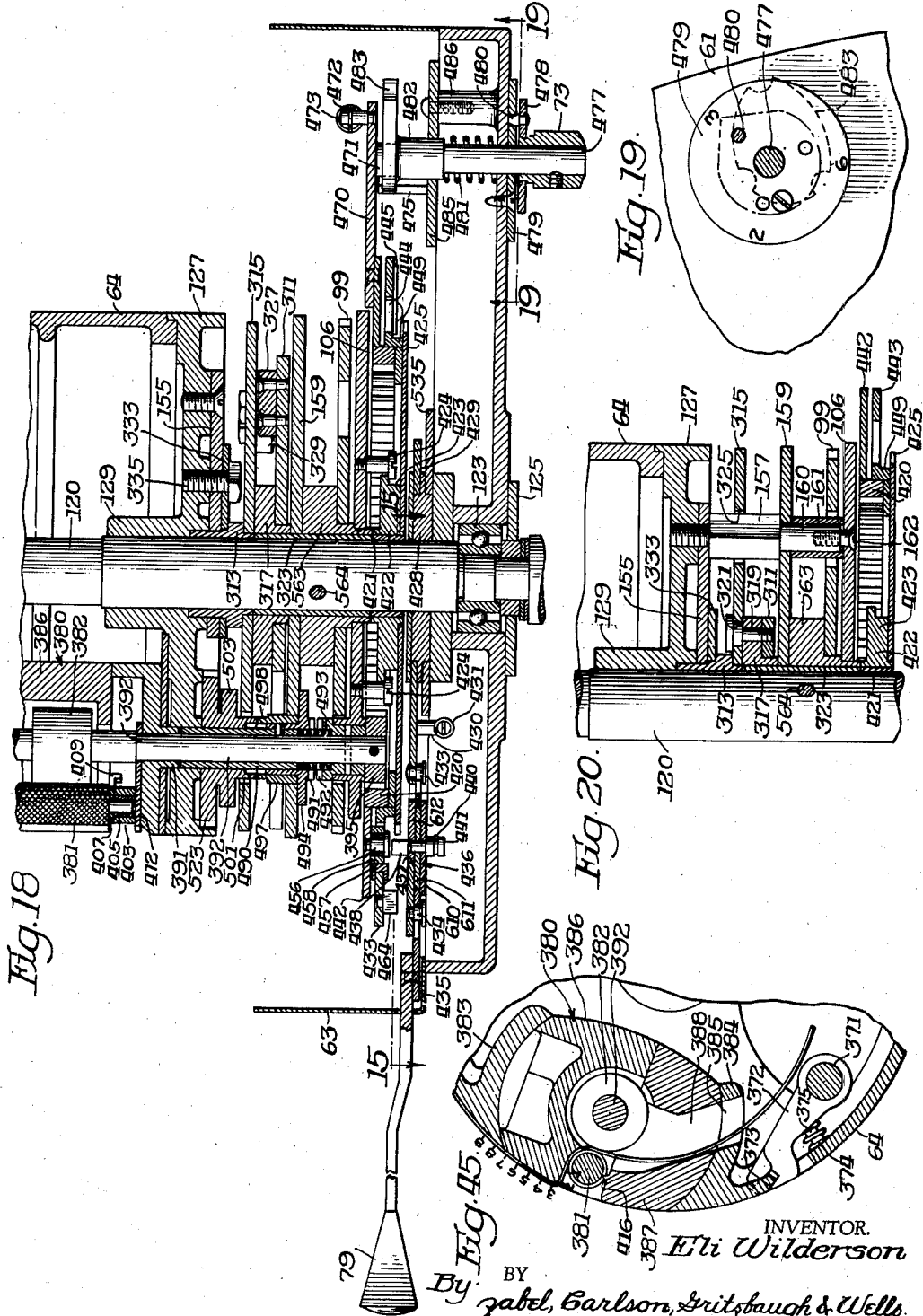

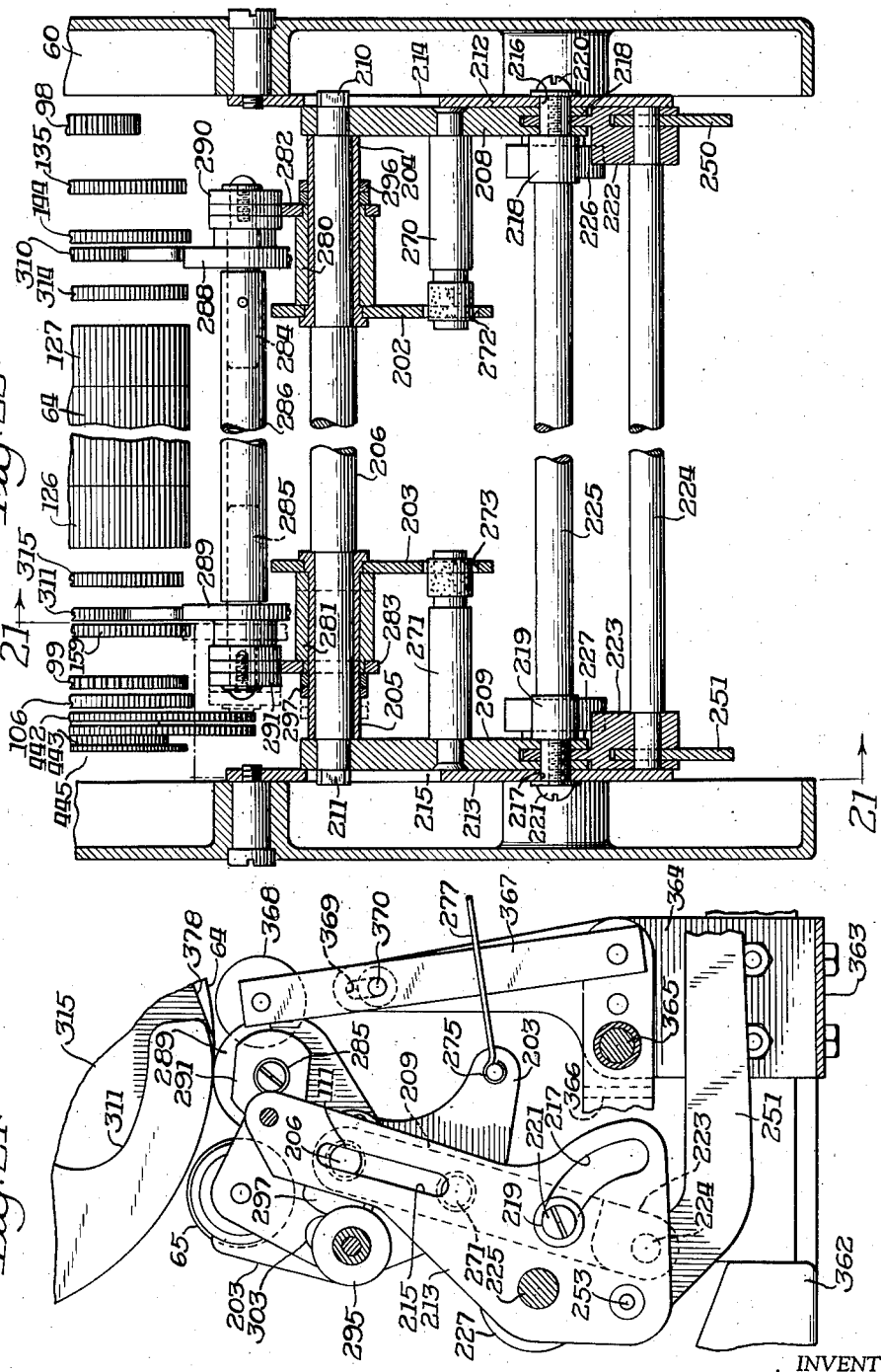

July 10, 1945.  E. WILDERSON  2,380,004
DUPLICATING APPARATUS
Filed Sept. 8, 1941   21 Sheets-Sheet 14
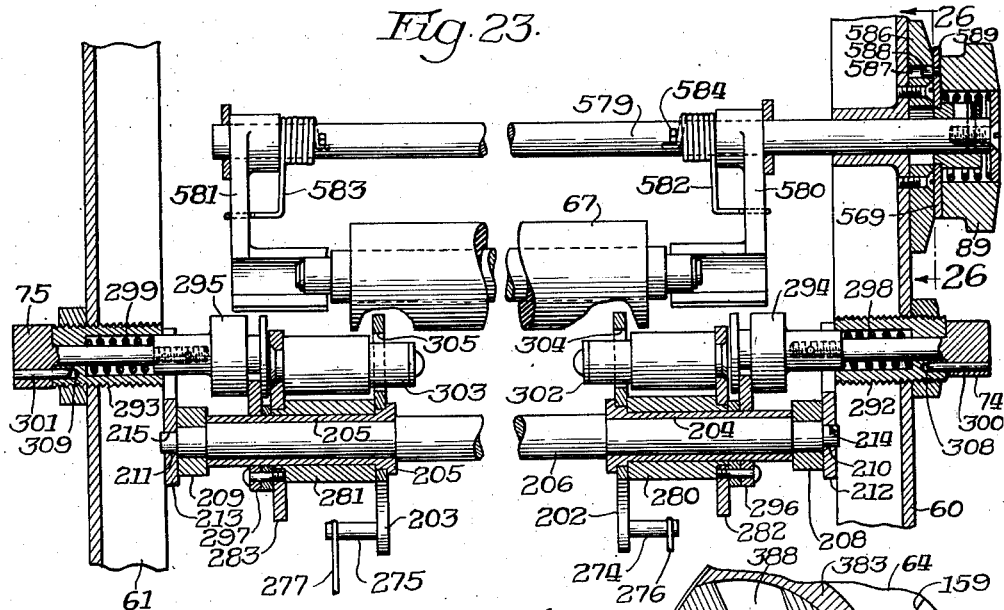
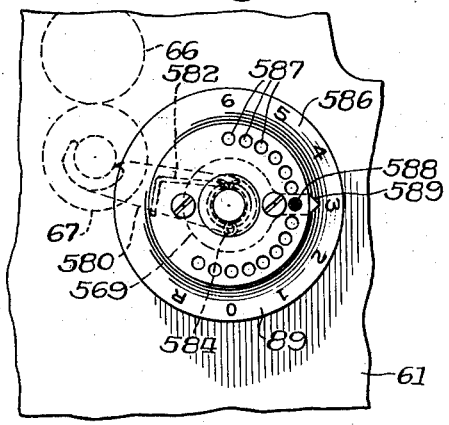
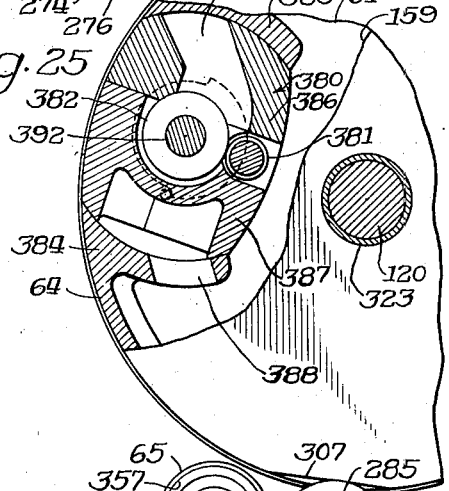
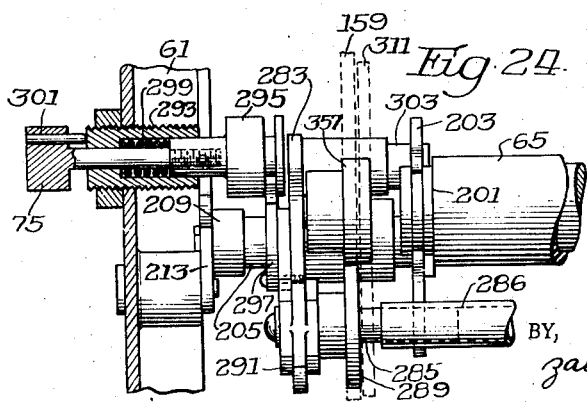
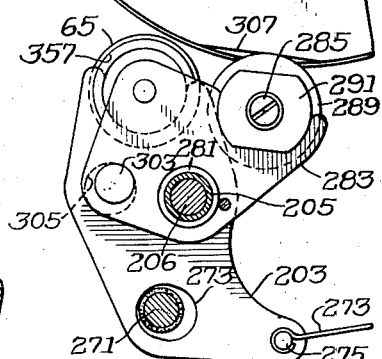
INVENTOR.
Eli Wilderson
BY Zabel, Carlson, Gritzbaugh & Wells
Attys.

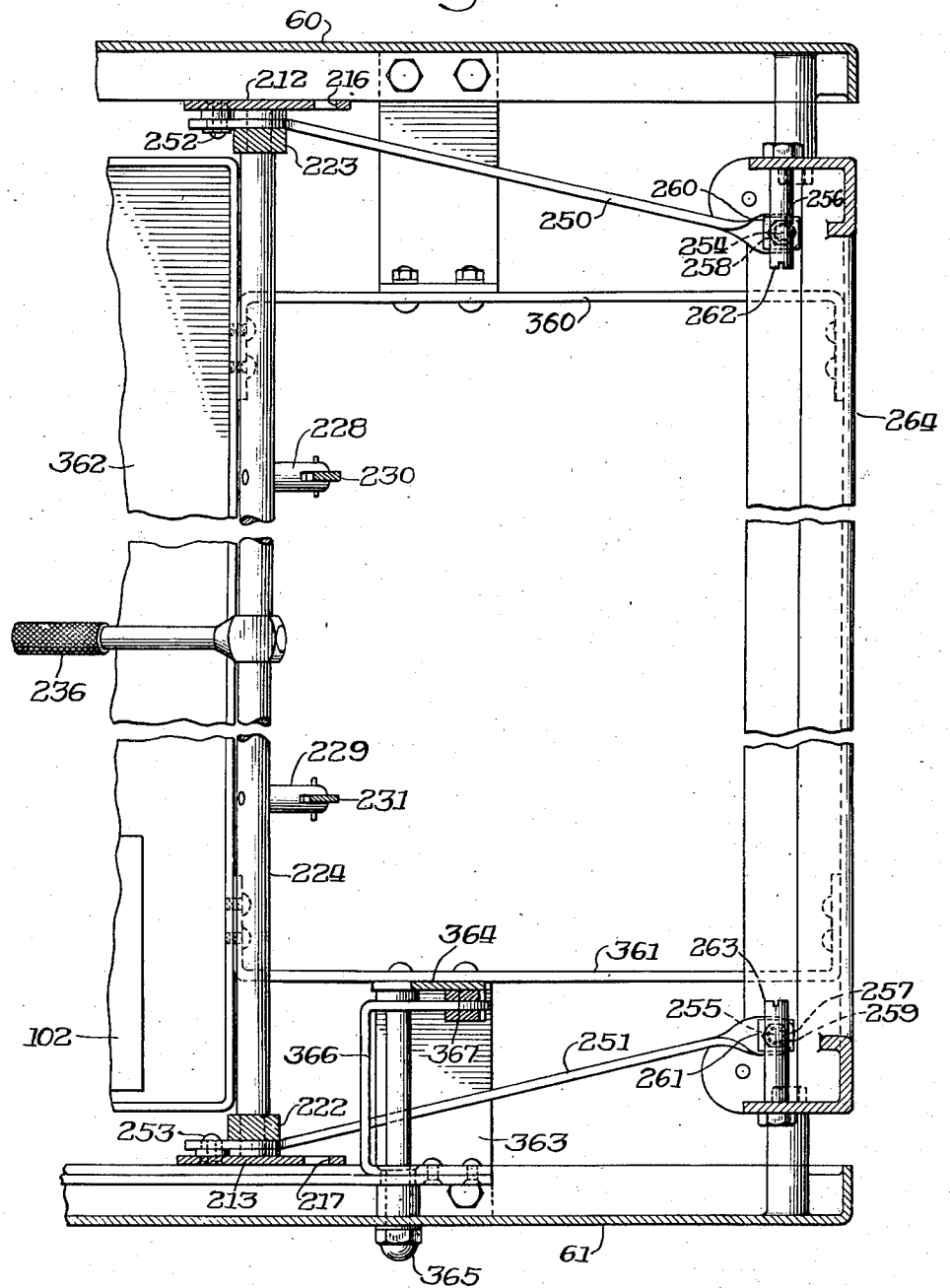

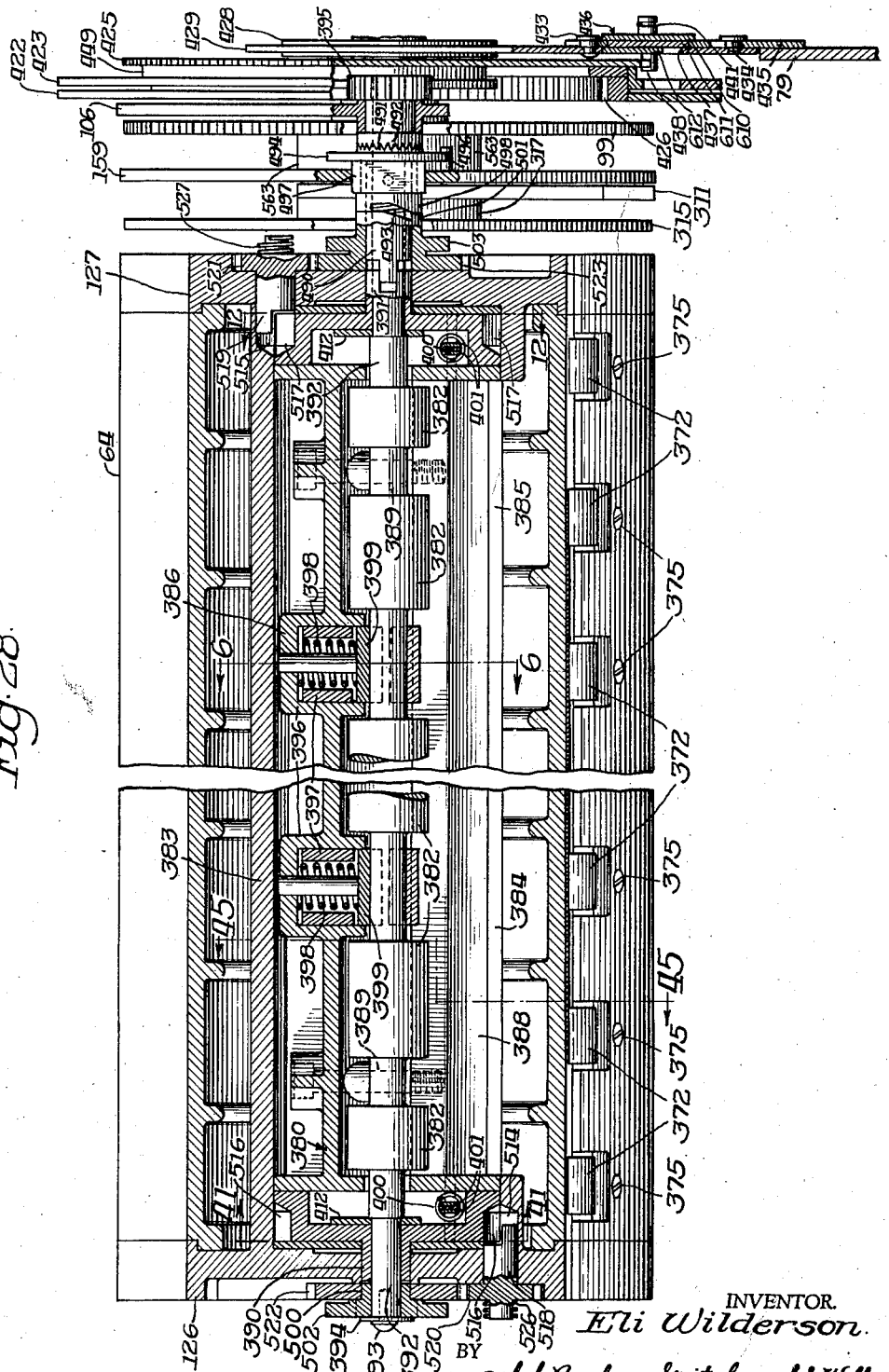

July 10, 1945.  E. WILDERSON  2,380,004
DUPLICATING APPARATUS
Filed Sept. 8, 1941    21 Sheets-Sheet 17
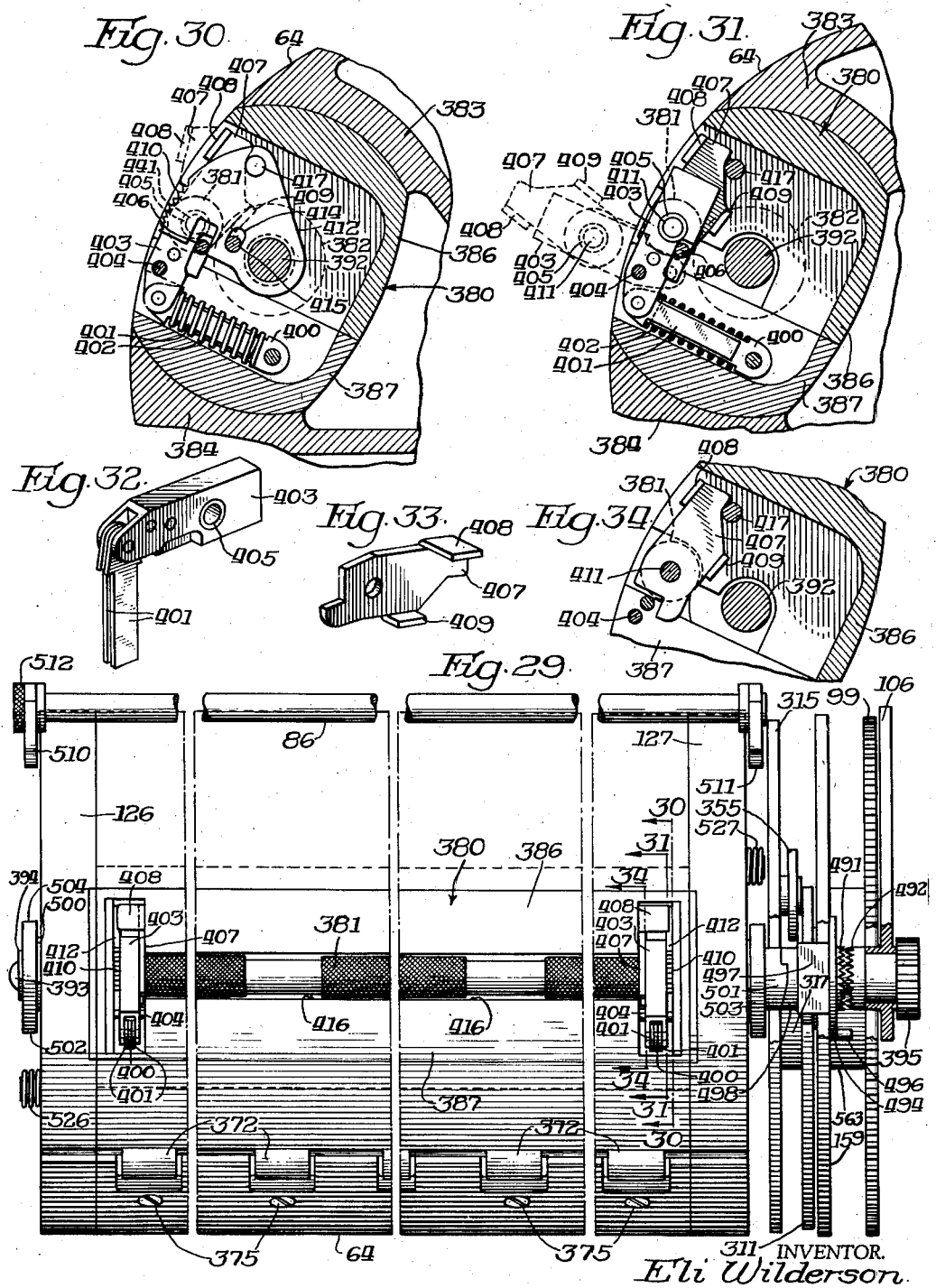

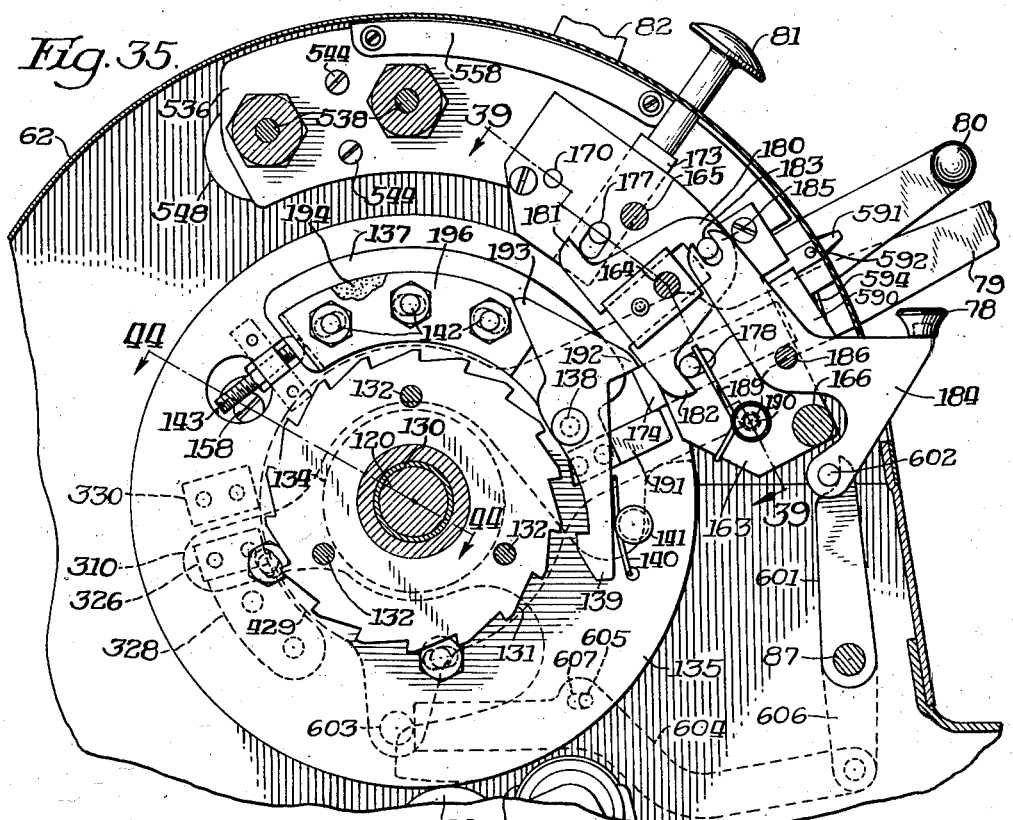
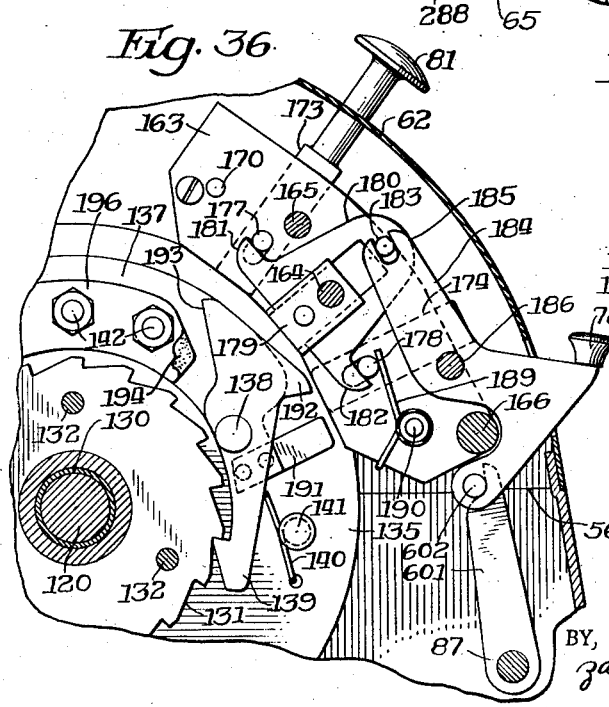
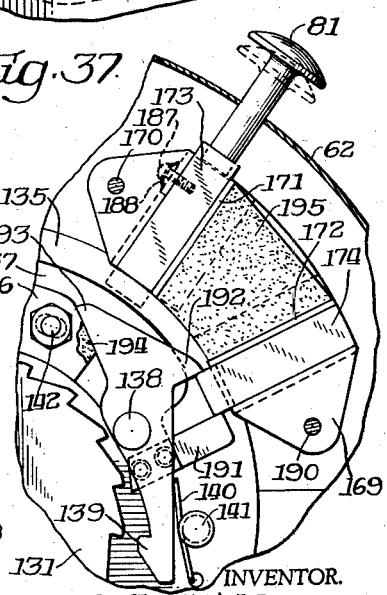

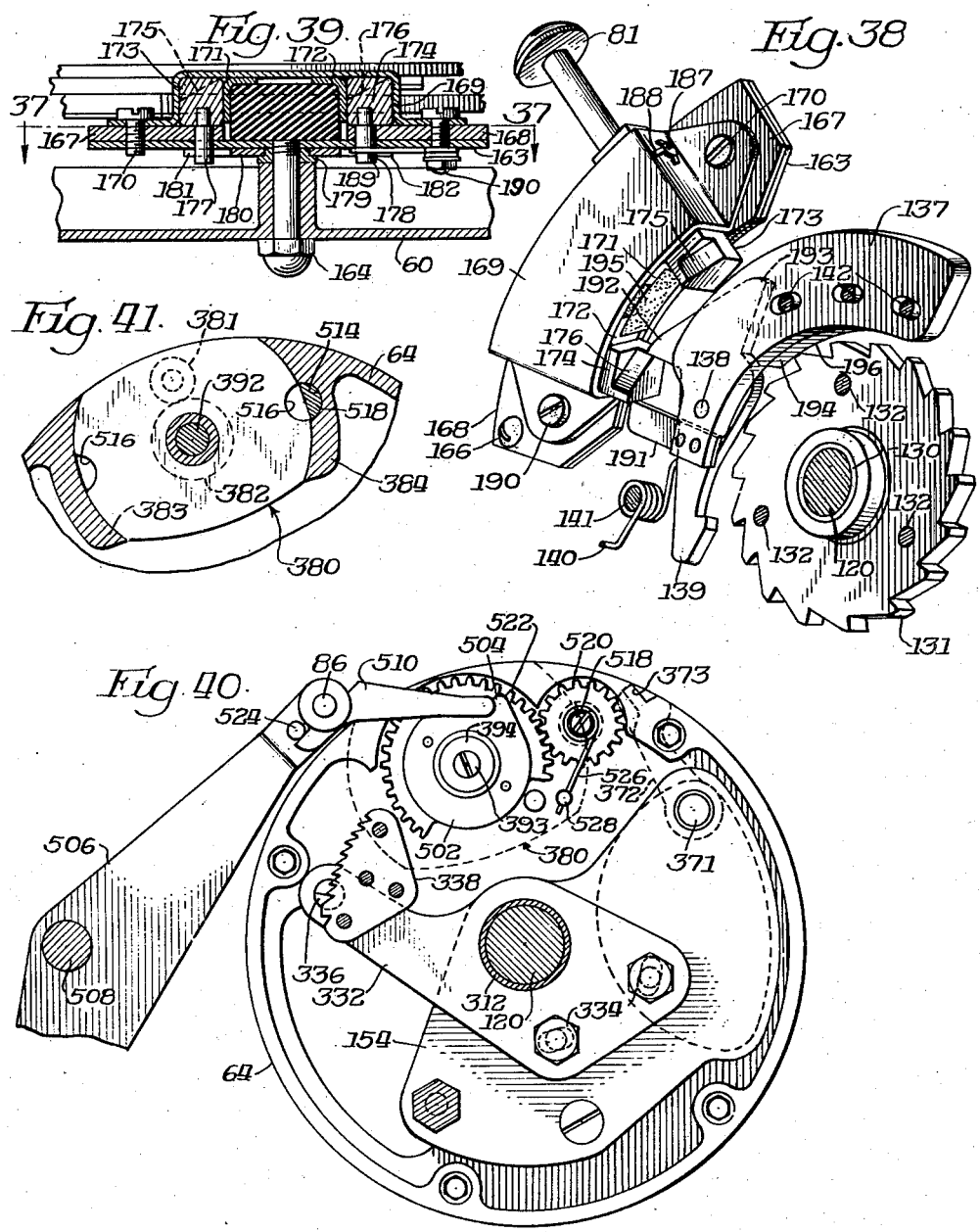

July 10, 1945.   E. WILDERSON   2,380,004
DUPLICATING APPARATUS
Filed Sept. 8, 1941   21 Sheets-Sheet 20
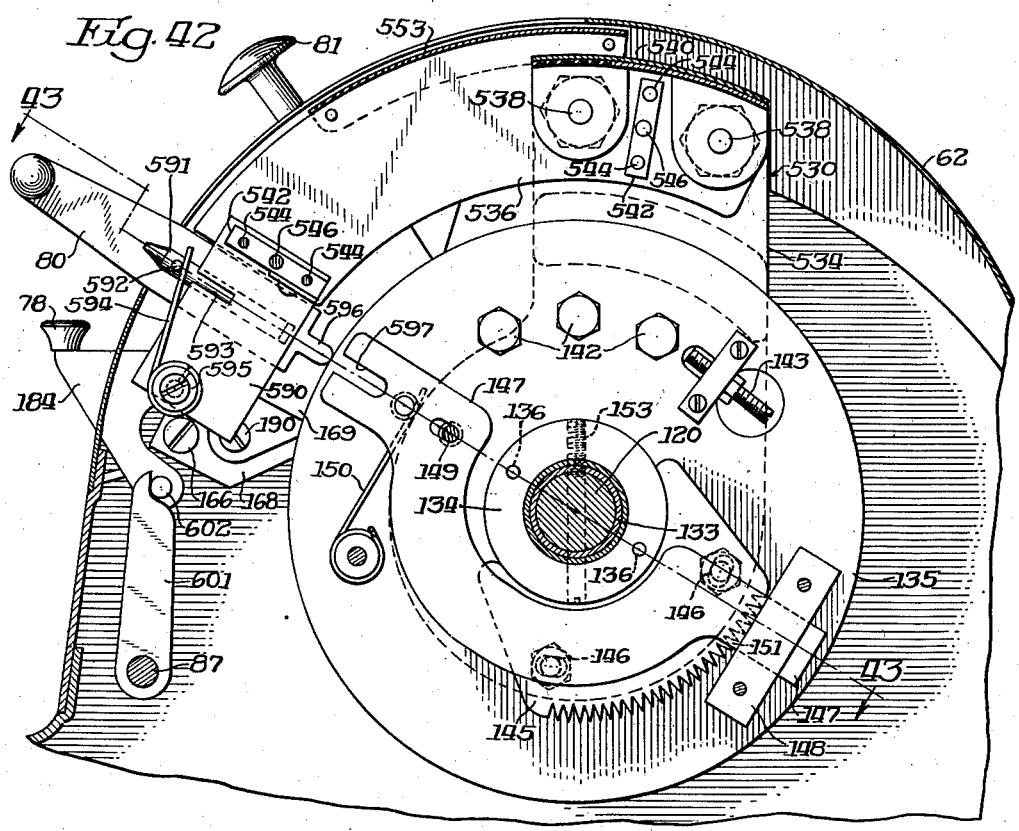
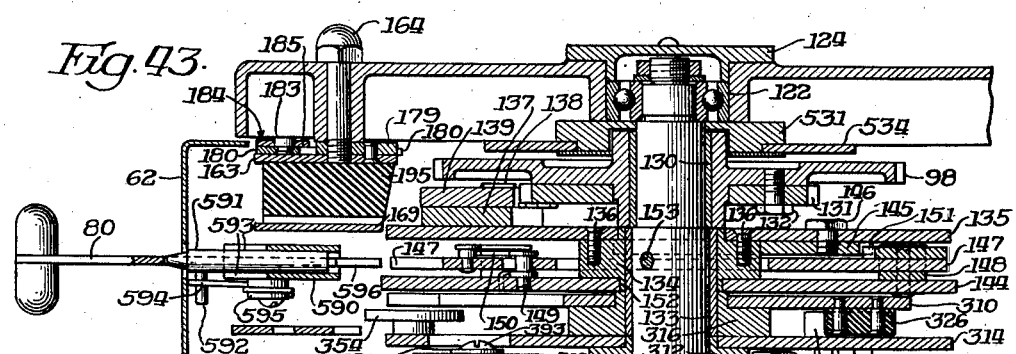
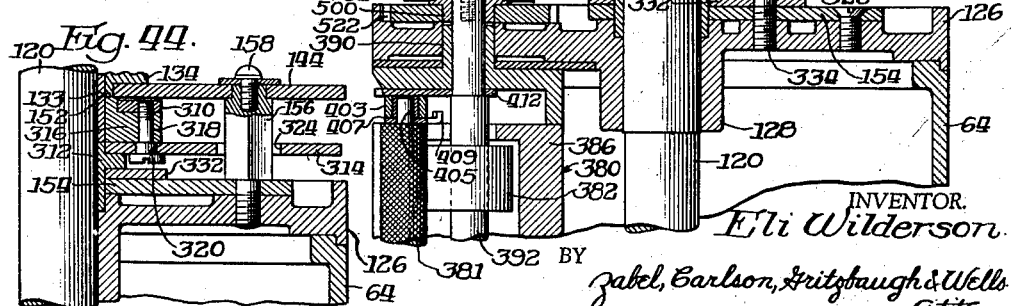

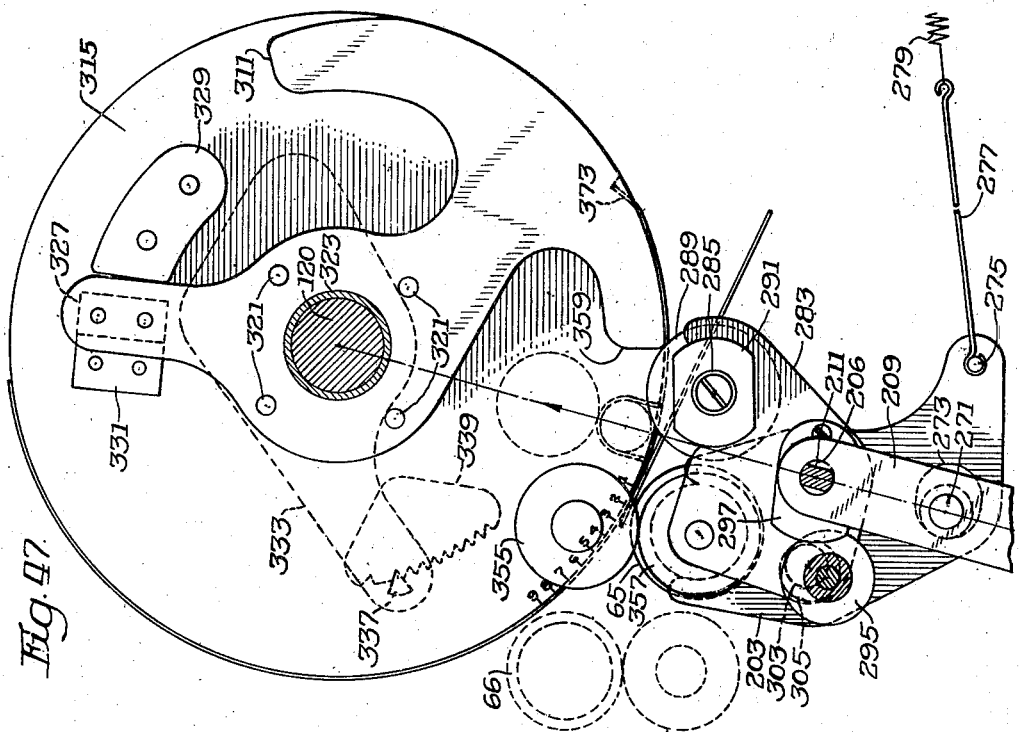
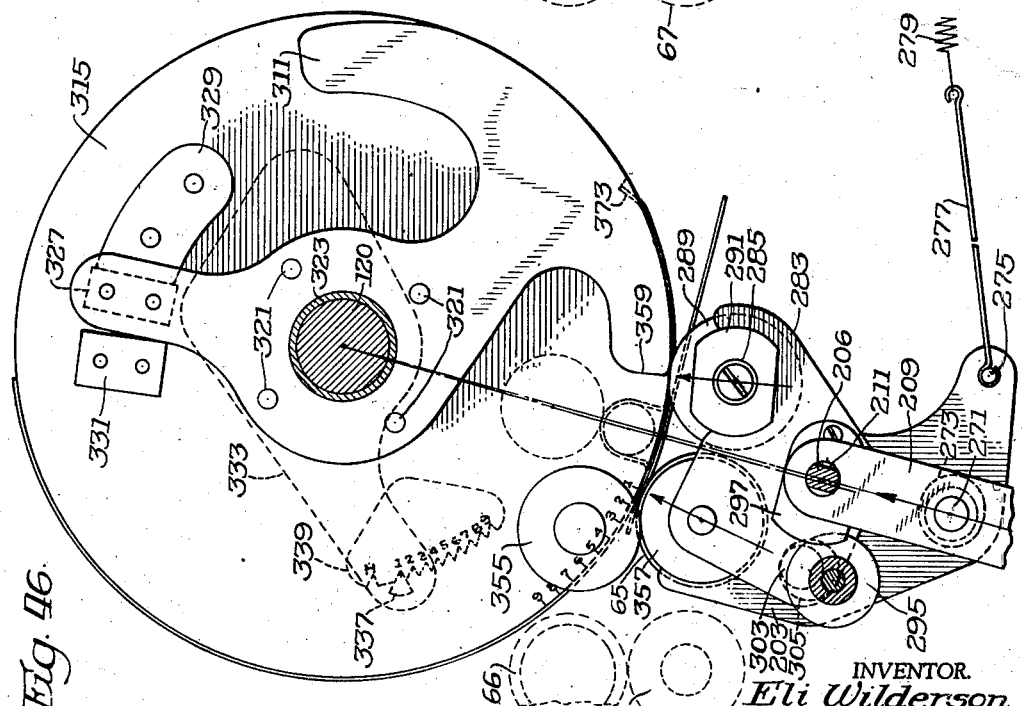

Patented July 10, 1945

2,380,004

UNITED STATES PATENT OFFICE 2,380,004

DUPLICATING APPARATUS

Eli Wilderson, Chicago, Ill., assignor to Ditto, Incorporated, Chicago, Ill., a corporation of West Virginia Application September 8, 1941, Serial No. 409,943

46 Claims. (Cl. 101—132.5)

This invention relates to improvements in duplicating and in particular to improvements in printing one or more lines or a predetermined portion of the matter carried on a rotary printing element.

In the embodiment shown herein the invention is applied to duplicating apparatus of the wet process type, although it may be applied to certain other types of duplicating apparatus in which the duplicating operation is effected by the co-action of two rotatable elements in pressure engagement with each other.

In the wet process type of duplication, the matter to be duplicated is formed in reverse upon a sheet, called the master sheet, in a soluble ink. A drum is provided to which the master sheet is secured and a copy sheet, premoistened with a suitable ink solvent, is fed into pressure engagement with the master sheet. A small amount of ink on the master sheet is thereby caused to be transferred to the copy sheet. A considerable number of copies may be made from one master sheet by this process if a sufficiently thin film of solvent is applied to the copy sheet, and if certain other variable factors are controlled.

In general this invention includes the step of releasing the pressure between the rotatable elements at a predetermined point in the revolution of the drum so that only a portion of the matter on the master sheet is duplicated on the copy sheet. In this manner the lower limit of the duplicated material is determined. The upper limit may be determined by the step of advancing the master sheet, or a portion thereof, with respect to the drum and with respect to the point where the pressure roller is initially brought into engagement with the master sheet or with a specified portion thereof.

The apparatus herein shown and described is designed particularly for certain types of bookkeeping work or the like wherein it is desired to duplicate the heading of an invoice or the like and only a portion, such as certain selected lines, of the remainder thereof. Means are provided to manually adjust the apparatus so that only the heading, or the heading and one line, or the heading and any predetermined number of consecutive lines will be duplicated. This may be termed selective printing.

Means are also provided so that when the apparatus is set to duplicate only the heading and a single line, to advance the lower portion of the master sheet with respect to the drum, line by line, so that each of the consecutive copies will have a different line duplicated thereon. This type of operation may be termed consecutive line printing.

Means are also provided to duplicate on a copy sheet the heading and a number of lines whether they are in consecutive order or not. In this type of operation the copy sheet is fed into the machine a number of times and not only is the particular line selected each time, as in selective printing, but means are provided to duplicate the selected line at a predetermined position on the copy sheet. This may be called collective printing inasmuch as a number of lines may be collected on a copy sheet irrespective of their consecutive order on the master sheet.

It is an object of this invention to provide an improved method and apparatus for accomplishing any one or more of the above results, and in particular for accomplishing said results at a comparatively high rate of speed.

With reference now to the drawings in which like reference numerals represent like parts—

Fig. 5 is a section taken along line 5—5 of Fig. 3;

Fig. 6 is a section taken along line 6—6 of Fig. 28;

Fig. 10 is a section taken along line 10—10 of Fig. 7;

Fig. 13 is a section taken along line 13—13 of Fig. 3;

Fig. 14 is a section taken along line 14—14 of Fig. 3;

Fig. 15 is a section taken along line 15—15 of Fig. 18;

Fig. 16 is a section taken along line 16—16 of Fig. 14;

Fig. 17 is a section taken along line 17—17 of Fig. 14;

Fig. 18 is a section taken along line 18—18 of Fig. 13;

Fig. 19 is a section taken along line 19—19 of Fig. 18;

Fig. 20 is a section taken along line 20—20 of Fig. 7;

Fig. 21 is a section taken along line 21—21 of Fig. 22;

Fig. 22 is a section taken along line 22—22 of Fig. 7;

Fig. 23 is a section taken along line 23—23 of Fig. 8;

Fig. 24 is a section taken along line 24—24 of Fig. 8;

Fig. 25 is a section taken along line 25—25 of Fig. 3, a portion of the drum being broken away to show certain portions thereof in a changed position;

Fig. 26 is a section taken along line 26—26 of Fig. 23;

Fig. 27 is a section taken along line 27—27 of Fig. 7;

Fig. 28 is a section taken along line 28—28 of Fig. 5;

Fig. 29 is a section taken along line 29—29 of Fig. 7;

Fig. 30 is a section taken along line 30—30 of Fig. 29;

Fig. 31 is a section taken along line 31—31 of Fig. 29;

Fig. 32 is a detailed perspective view of one of the parts shown in Fig. 31;

Fig. 33 is a detailed perspective view of one of the parts shown in Fig. 31;

Fig. 34 is a section taken along line 34—34 of Fig. 29;

Fig. 35 is a section taken along line 35—35 of Fig. 3;

Fig. 36 is a sectional view similar to Fig. 35 showing the parts in a changed position;

Fig. 37 is a section taken along line 37—37 of Fig. 39;

Fig. 38 is a detailed perspective view of certain of the parts shown in Fig. 35;

Fig. 39 is a section taken along line 39—39 of Fig. 35;

Fig. 40 is a section taken along line 40—40 of Fig. 3;

Fig. 41 is a section taken along line 41—41 of Fig. 28;

Fig. 42 is a section taken along line 42—42 of Fig. 3;

Fig. 43 is a section taken along line 43—43 of Fig. 42;

Fig. 44 is a section taken along line 44—44 of Fig. 35;

Fig. 45 is a section taken along line 45—45 of Fig. 28;

Fig. 46 is a section similar to that shown in Fig. 7 but with the parts shown in a changed position, certain parts being omitted for the purpose of clarity;

Fig. 47 is a sectional view similar to Fig. 46, but showing the parts in a changed position;

Fig. 48 is an elevation of a master sheet;

Figs. 49 and 50 are elevations of a copy sheet which are examples of selective printing;

Fig. 51 is an elevation of a copy sheet which is an example of consecutive line printing; and Fig. 52 is an elevation of a copy sheet which is an example of collective line printing.

Figure 1:
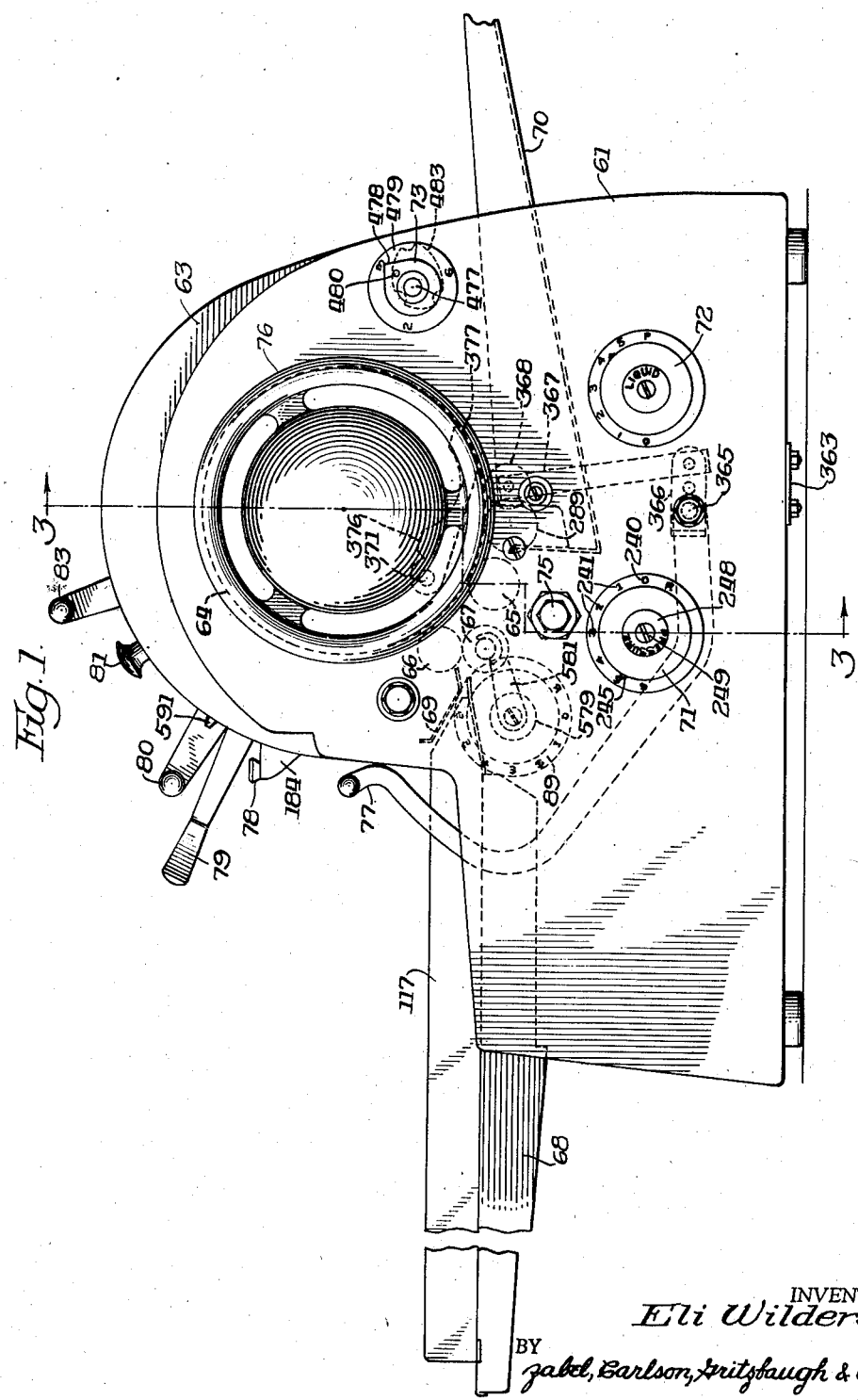
Fig. 1 is a side elevation of a preferred embodiment of this invention.
Figure 2:
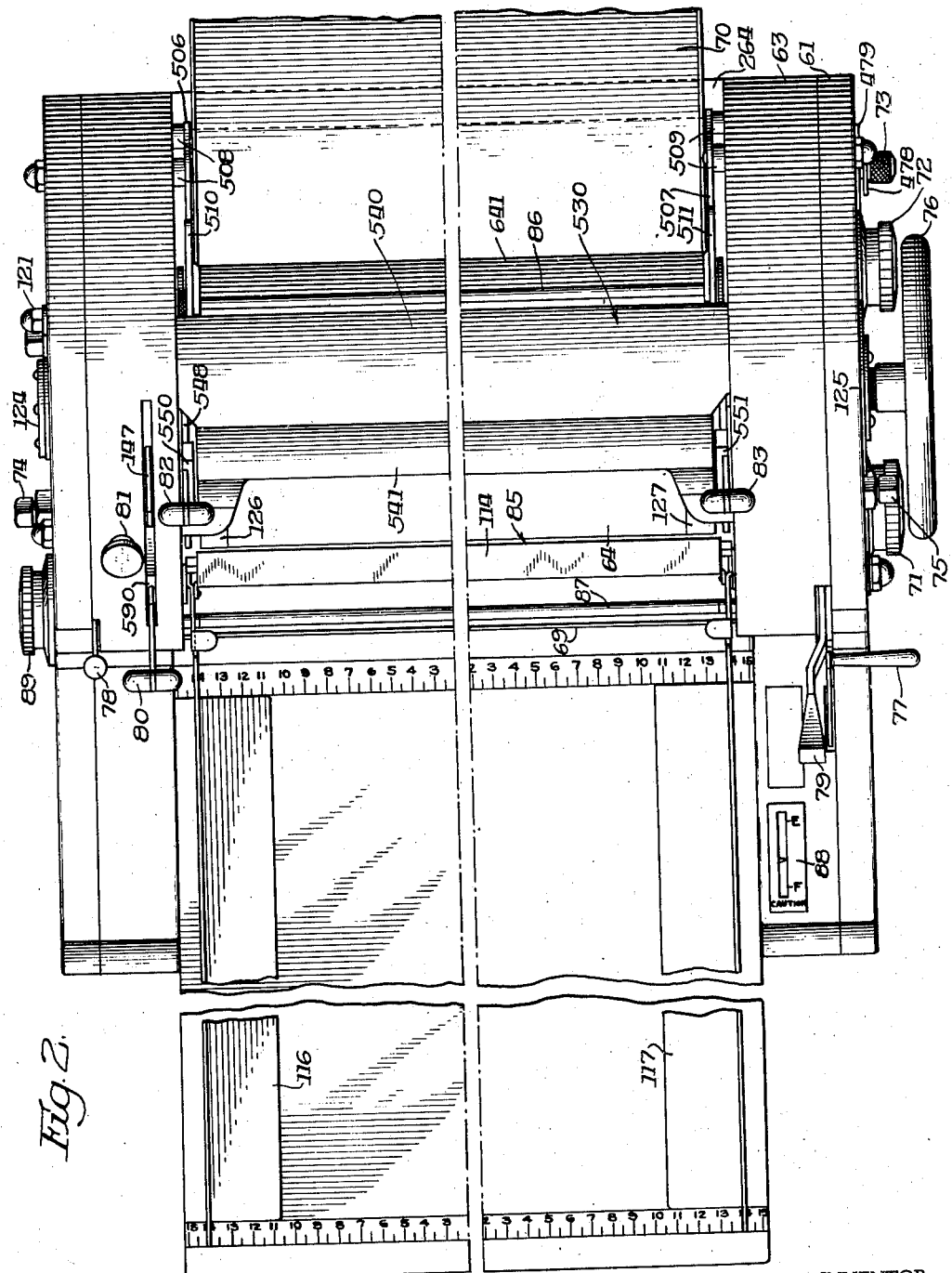
Fig. 2 is a plan view of Fig. 1.

Referring now to Figs. 1 and 2 in which the general configuration of the duplicating machine, and the manual controls therefor are shown, reference numerals 60 and 61 indicate the left-hand and right-hand side frames respectively. Shells 62 and 63 are provided at the left-hand and right-hand ends of the machine, respectively, to enclose certain of the parts, the shells being suitably secured to the frame members 60 and 61. The shells may be apertured or slotted to permit certain control members to extend therethrough. The duplicating machine is provided with a drum 64 and a pressure roller 65. An upper feeding and moistening roller 66 is disposed in front of the drum, and a lower feeding roller 67 is suitably mounted for cooperation therewith. A feed tray 68 is disposed in front of the feeding rollers, and is provided with adjustable side guides 116 and 117. An upper feed tray guide 69 is provided at the forward end of the feed tray and serves to direct a copy sheet into the feeding rollers. A receiving tray 70 is provided at the rear end of the machine to receive copy sheets after they have been duplicated upon.

Extending outwardly from the right frame member 61 are a pressure roller adjusting knob 71, a liquid control knob 72, and a master sheet advancing control knob 73. Shifting knobs 74 and 75 are provided at either side of the machine in order to shift the machine from line printing to straight duplicating and vice versa. A hand wheel 76 is provided for rotating the drum manually. A gripper actuating handle 77 is provided at the right end of the machine to open and close the gripping elements for the master sheet.

A trip button 78 is provided at the left side of the machine to cause the drum to be rotated through a complete printing revolution. A handle 81 is also provided for causing the drum to stop in the master sheet changing position.

A handle 79 is provided at the right side of the machine for actuating the gathering device to advance the master sheet. A back spacer handle 80 is provided at the left side of the machine which is used in collective printing.

Controls 82 and 83 are provided at either side of the machine for adjusting the kickoff device for the pressure roller in order to determine the number of lines to be printed during selective printing operation.

A moistener 85 is provided to moisten the upper feeding and moistening roller 66.

A shaft 86 extends across the upper rear portion of the drum as shown in Fig. 2 which is utilized for reversing the tumbler when it is desired to shift from line printing to straight duplicating and vice versa. A trip shaft 87 is disposed in front of the drum, and is associated with the trip button 78.

A liquid level gauge 88 is provided as shown in Fig. 2 at the forward right-hand portion of the machine to indicate the amount of solvent in the tank 102.

A pressure control knob 89 is provided at the left side of the machine for regulating the pressure between the feeding rollers.

Figure 4:
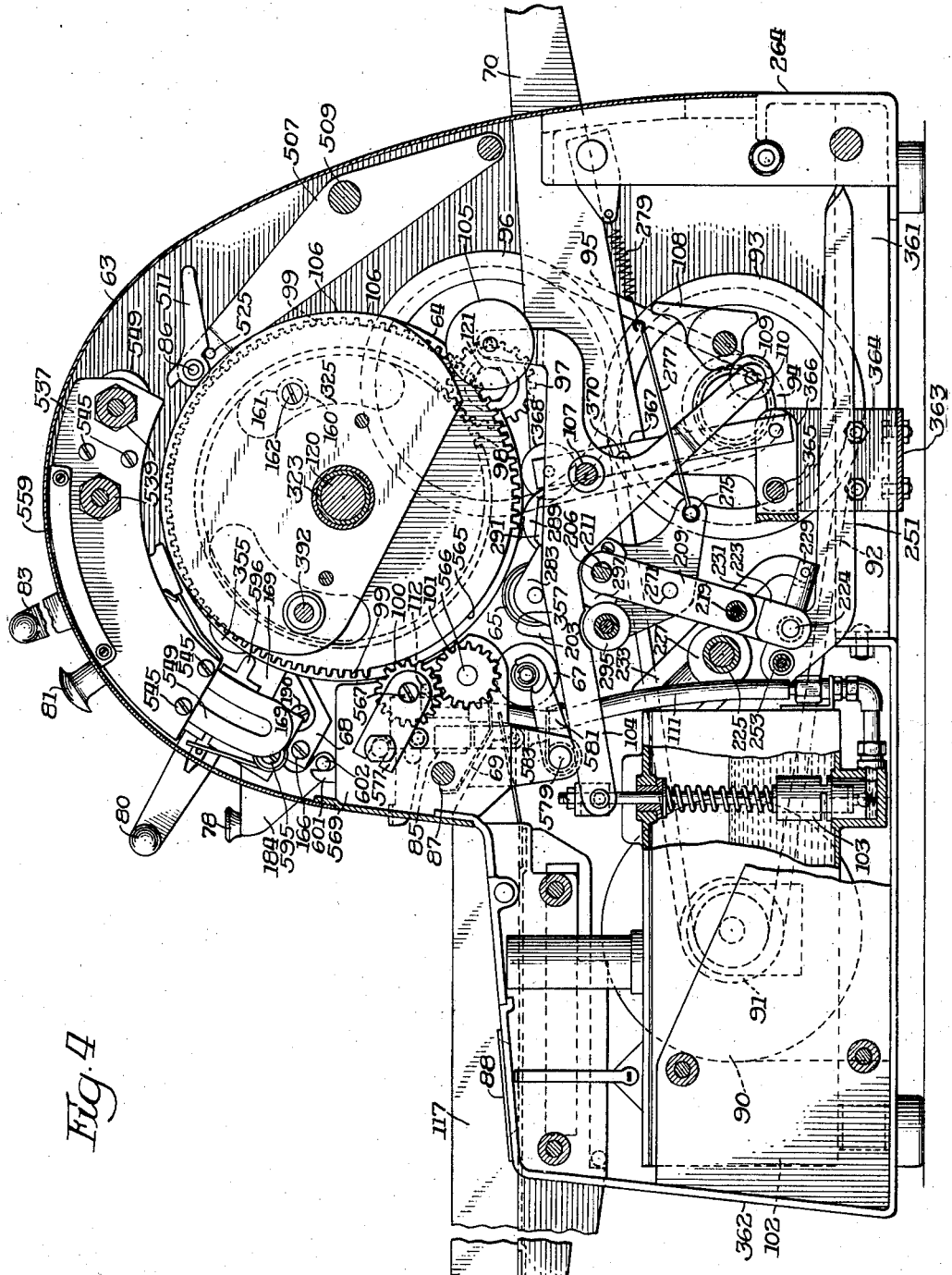
Fig. 4 is a section taken along line 4—4 of Fig. 3.

The side frame members 60 and 61 are connected by a rear frame member 264 and by a front frame member 362 as shown in Fig. 4. An electric motor 90 is mounted on the base portion of the front frame member 362, and is provided with a pulley 91. Pulleys 93 and 94 are mounted on the left frame member and are driven by a belt 92 from the motor. A belt 95 extends between pulleys 94 and 96, the latter pulley being mounted on shaft 121 and having associated therewith a drive pinion 97. A gear 98, which is mounted on the drum shaft 120 meshes with the drive pinion 97 so that the drum shaft may be driven from the motor 90. The drum itself is associated with the drum shaft by clutch means hereinafter described.

An interrupted gear 99 is secured to the drum shaft 120 for driving the feeding rollers. An idler gear 100 is interposed between the upper feed roller gear 101 and the interrupted gear 99 so that the upper feed roller may be rotated in the same direction as the drum. The lower feed roller 67 is rotated by means of its frictional contact with the upper feed roller 66.

The tank 102 is mounted on the front frame member 362 and is provided with a pump indicated generally at 103. A pump lever 104, pivoted on a stud 107 associated with the frame member 61 is provided with a follower roller 105 which is adapted to cooperate with the pump cam 106. The pump cam is associated with the drum so that as the drum rotates, the pump will be actuated once for each rotation of the drum. A regulating cam 108 associated with the liquid control knob 72 is adapted to be engaged by a roller 109 mounted on an arm 110 of the pump lever 104. It will be seen that adjustment of the knob 72 will limit the angular displacement of the pump lever 104, in order to control the displacement of the pump. A conduit 111 extends from the pump 103 to the moistener 85. The moistener as shown in Fig. 5 comprises a spray tube 112 which is disposed over the upper feed roller 66, and a felt wiper 113 which contacts the sprayed portion of the roller surface. These elements are mounted in a housing 114.

Figure 3:
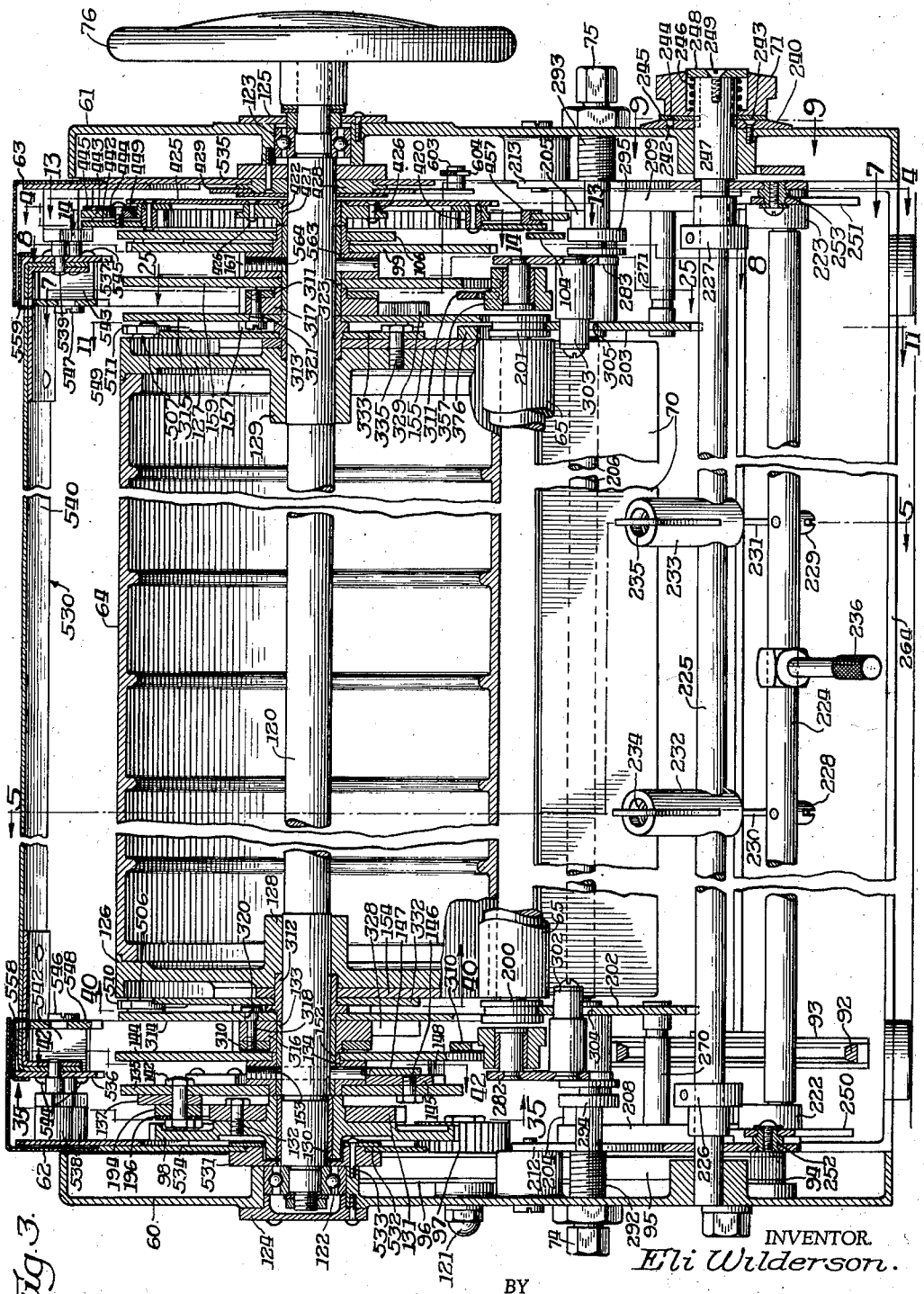
Fig. 3 is a section taken along line 3—3 of Fig. 1.

As shown in Fig. 3, the drum shaft 120 is journalled in ball bearing units 122 and 123 which are suitably mounted in the side frames 60 and 61. Plates 124 and 125 are suitably bolted to the side frame members and serve to hold the bearing units in place. The drum 64 is provided with end members 126 and 127 which carry hubs 128 and 129 which rotatably engage the drum shaft 120.

Various elements are mounted on the drum shaft to control the operation of the machine. The left-hand portion of the drum shaft and drum assembly is shown in greater detail in Figs. 43 and 44, and the right-hand portions of this assembly are shown in Figs. 18 and 20. As shown in Figs. 3 and 43, a bushing 130 is provided on the drum shaft for the driven gear 98. The central portion of the driven gear is enlarged to form a hub and a ratchet wheel 131 is mounted on this hub portion and is secured to the gear 98 by means of studs 132. Another bushing 133 is mounted on the shaft 120 for cooperation with the hub 134. The hub is pinned to the shaft by means of a pin 153. A disc 135 is secured to the hub 134 by means of studs 136 so that the position of the disc always corresponds to the position of the shaft. A curved plate 137 is secured to the disc 135 and a short shaft 138 is mounted therein toward the leading edge thereof. A pawl 139 is mounted on the shaft 138 for cooperation with the ratchet wheel 131 as shown in Figs. 35 and 38. A spring 140, which is mounted on a stud 141, is provided to bias the pawl into engagement with the ratchet wheel. The plate 137 is secured to the disc 135 by means of studs 142, the plate being slotted so that the position of the plate with respect to the disc may be changed. Adjusting means 143 are mounted on the disc 135 and bear against the trailing edge of the plate 137 to adjust the same. It will be seen that the shaft 120 is driven by the motor through the ratchet 131 and the pawl 139.

A middle disc 144 is rotatably mounted with respect to the shaft on an extension of hub 134. A toothed plate or segment 145 is adjustably mounted on the end disc 135 by means of studs 146. A sliding plate 147 is associated with the middle disc 144 by means of a guide block 148 which is cut away to receive a projecting portion of the plate 147. A headed pin 149, mounted on the middle disc 144, extends through a slot in the sliding plate 147. The plate carries a toothed portion 151 which is adapted to engage with the toothed segment 145, and a suitable spring 150 is provided to bias the plate in a direction wherein these toothed portions cooperate. It will be seen that by depressing the plate 147 against the bias of the spring 150, the angular position of the middle disk 144 with respect to the shaft 120 may be changed. The toothed portions serve to hold the middle disc securely in any one of a number of predetermined positions.

Plates 154 and 155 are affixed to the end members 126 and 127 of the drum. A spacer stud 156 extends between the middle disc 144 and the end member 124 of the drum, the stud being threaded into the latter member, and being secured to the middle disc by means of a screw 158.

A corresponding spacer stud 157 is provided, as shown in Fig. 20 to secure the middle disc 159 at the right-hand end of the drum assembly to the end member 127. The spacer stud 157 is provided with a reduced portion 160 which is secured to the pump cam 106 by means of a screw 162. A sleeve 161 surrounding the reduced portion 160 serves to space the pump cam 106 from the middle disc 159. It will be seen that the middle discs 144 and 159, and the drum 64 and the pump cam 106 are all secured to each other, and are adjustably mounted on the drum shaft 120. As pointed out above, the toothed elements associated with the discs 135 and 144 serve to hold the drum and its associated elements in a predetermined adjusted position with respect to the drum shaft 120.

Means are provided to automatically stop the drum after a single revolution so that the operator may perform certain other operations before feeding in another copy sheet. This means includes a stop member which is projected into the path of the pawl 139 to cause the same to be disengaged from the ratchet 131, and at the same time to lock the pawl and the drum assembly against further rotation. Manual depression of the trip button 78 causes withdrawal of the stop member and permits the pawl to engage the ratchet in order that the drum assembly may be driven another revolution.

A plate 163 is suitably secured to the frame member 60 by studs 164, 165, and 166 as shown in Figs. 35 and 39. Plates 167 and 168 and a bracket 169 are secured to the plate 163, at either end thereof, by screws 170 and 190. Strips of angle iron 171 and 172 are inserted between the bracket 169 and the plate 163, and are spaced from each other by means of a rubber block 195. The strips of angle iron form, together with the bracket, a guideway for the sliding stop members 173 and 174. The lower extremities of the guide members are formed with cam surfaces 175 and 176 as shown in Fig. 38. The plates 163, 167, and 168 are slotted to permit pins 177 and 178, which are mounted in the sliding stop members 173 and 174, to project therethrough so as to limit the sliding movement of the stop members. As indicated in Fig. 39, a spacer 179 is provided on the stud 164 to space the plate 163 away from the frame member 60, and also to serve as a guide for a sliding yoke 180, the yoke being provided with arms 181 and 182 which are adapted to engage the pins 177 and 178. A pin 183 projects from the central portion of the yoke 180, and is engaged by the forked end 185 of lever 184. The lever 184 is pivoted on a pin 186 which is mounted on the frame 60. The trip button 78 is secured to the lever 184, and it will be seen that depression of the trip button will cause the yoke 180 to move upwardly so as to withdraw the stop members from the path of the pawl. The handle 81 for stopping the drum in the master changing position is attached to the sliding stop member 173 and is provided with a small screw 187, as shown in Fig. 37 which projects through a slotted portion of the bracket 169. A friction spider 188 is mounted on the screw 187 to cause the sliding member 173 to remain in either its withdrawn or depressed position. A coil spring 189 engages the pin 178 to urge the stop member 174 into the path of the pawl 139. The spring 189 is anchored on the screw 190 in plate 163, and the free end engages the edge of the latter plate.

A short leaf spring 191 is secured to the leading edge of the plate 137 and is adapted to engage and be displaced by the cam surfaces 175 and 176 on the stop members 173 and 174. The pawl 139 is provided with a shoulder 192 which engages the stop members so as to rotate the pawl out of engagement with the ratchet as shown in Fig. 38. After the pawl has been disengaged, the leaf spring 191 snaps over the stop member and prevents any reverse motion or rebound of the drum assembly which is likely to occur after the shoulder has engaged the stop member. It will be noted that a lug 193 is provided at the trailing edge of the pawl 139 which is adapted to engage a rubber block 194 which is mounted on the plate 137 by means of a thin plate 196. The rotation of the pawl is limited by the rubber block, and the latter acts to absorb the shock of the abrupt engagement of the shoulder 192 with either one of the stop members. The rubber block 195 in the bracket 169 also serves to absorb the shock.

As indicated above, the stop member 174 is biased into the path of the shoulder 192 of the pawl 139 so that the disc 135 will stop in the same position at the end of each revolution. For a subsequent operation of the machine, the trip button 78 is depressed. By means of the toothed elements above described, this home position of the drum may be adjusted. When it is desired to change the master, the handle 81 is depressed which causes the drum to stop in a position somewhat in advance of its home position. This position is more convenient for changing the master sheet. The stop 173 may be withdrawn from the pawl by depressing the trip button 78, just as in the case of the stop member 174.

Figure 11:
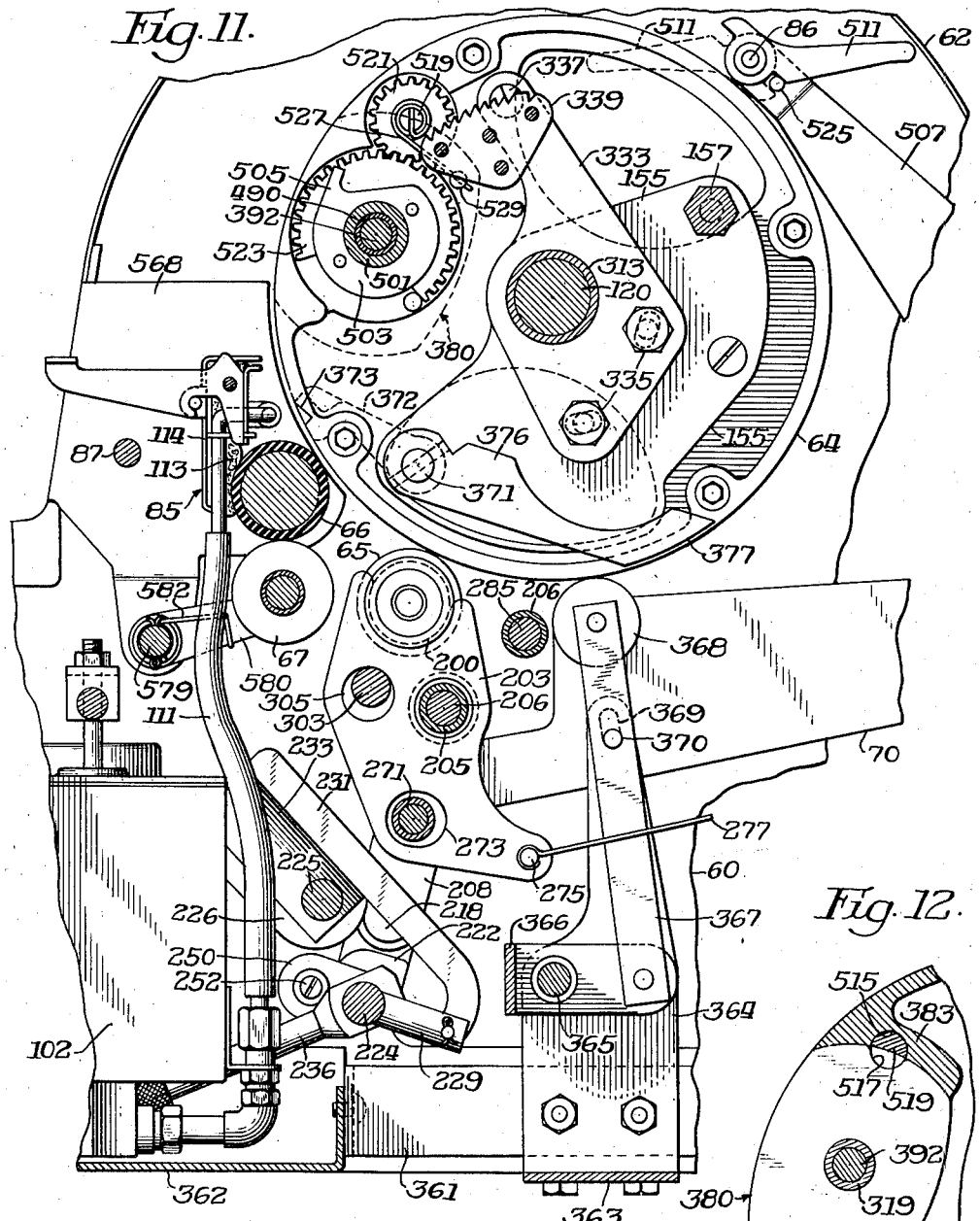
Fig. 11 is a section taken along line 11—11 of Fig. 3.

The means by which the pressure roller 65 is mounted so as to be held against the drum 64 is shown in Figs. 11 and 21. The pressure roller is provided with bearings 200 and 201 at either end thereof, which bearings are cradled in plates 202 and 203.

Figure 7:
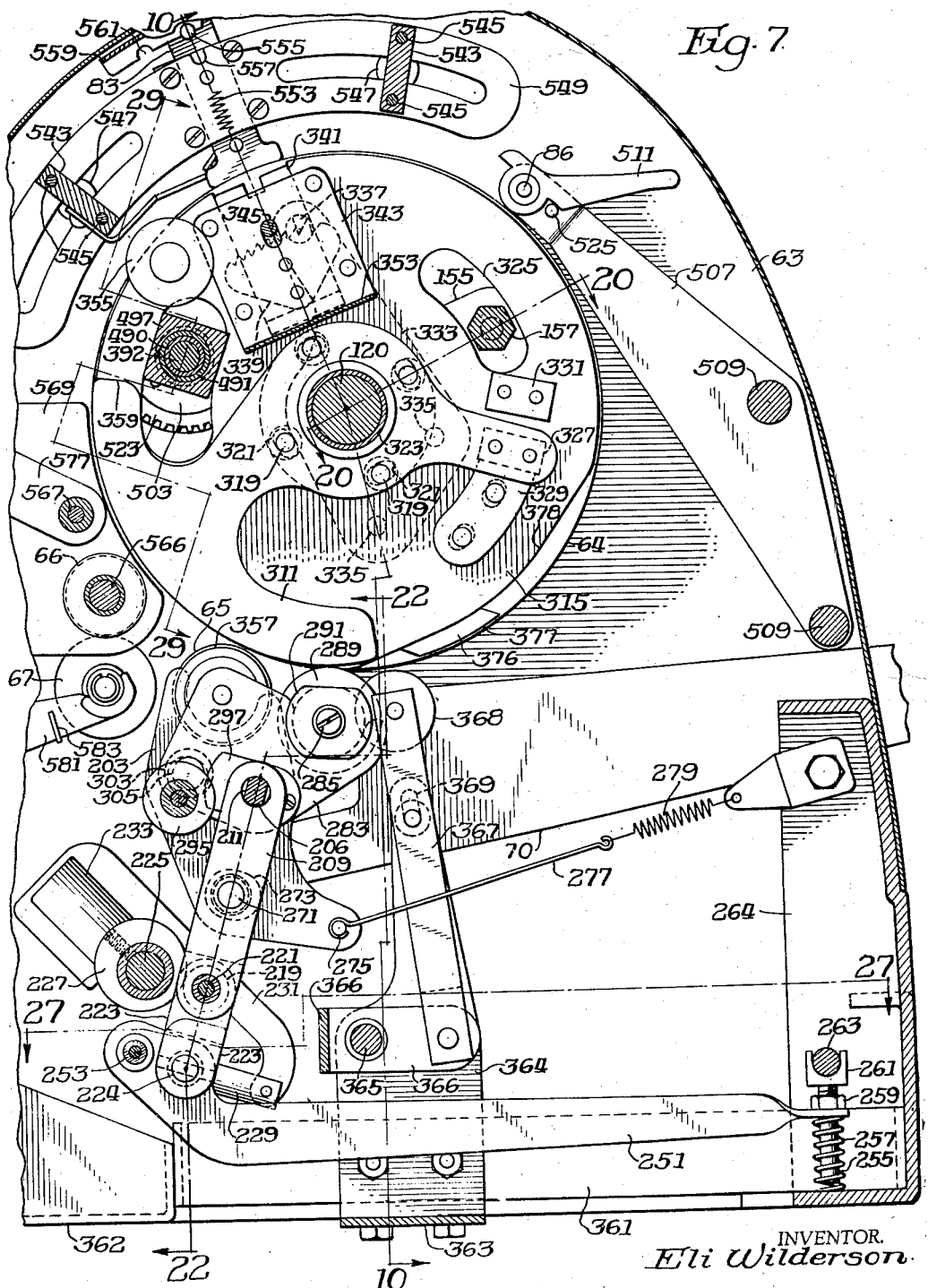
Fig. 7 is a section taken along line 7—7 of Fig. 3.

As shown in Figs. 7 and 23, a shaft 206 is supported at either end by toggle members 208 and 209. The outer ends of the shaft 206 are flattened as shown at 210 and 211 and are received in slots 214 and 215 formed in guide plates 212 and 213 which are secured to the frame members 60 and 61. The shaft 206 is provided with bushings 204 and 205 on which bushings the plates 202 and 203 are rotatably mounted. As shown in Fig. 21, the guide plates 212 and 213 are also provided with curved slots 216 and 217 in which the extended toggle pins 218 and 219 are adapted to slide. The lower toggle members 222 and 223 are pinned to a shaft 224, and are linked to the upper toggle members 208 and 209 by means of the pins 218 and 219. As shown in Fig. 22, screws 220 and 221 take into the toggle pins and serve to hold the upper and lower toggle members against the guide plates 212 and 213. As the shaft 224 is rotated, it will be seen that the toggles force the plates 202 and 203 upwardly so as to cause the pressure roller 65 to be moved into proximity to the drum. A shaft 225 is journalled in the side frames and is provided with cams 226 and 227, which cams as shown in Fig. 7 are adapted to bear against the toggle pins 218 and 219 to regulate the position of the shaft 206.

The shaft 224 is provided with arms 228 and 229, to the outer end of which are linked members 230 and 231. These members are provided with bent-over end portions which fit into slotted spring housings 232 and 233, these housings being rotatably mounted on the cam shaft 225. Over-center springs 234 and 235 are located within the housings 232 and 233 and urge the toggle shaft 224 into either one of two positions. As shown in Fig. 5, the toggle shaft is urged into its adjusted operative position, the adjustment being provided by the position of the cams 226 and 227. By raising the handle 236, which is secured to the toggle shaft 224, the toggle is broken and the shaft 206 is lowered to the inoperative position. When the shaft 206 is in its operative position, it will withstand a very great force without collapsing the toggle due to the effect of the springs 234 and 235.

Figure 9:
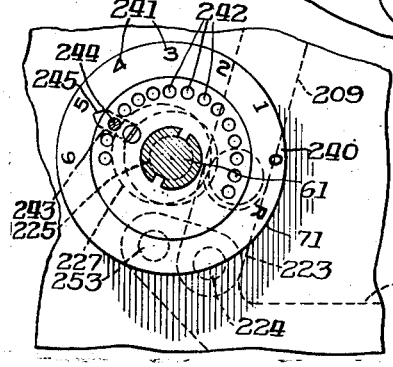
Fig. 9 is a section taken along line 9—9 of Fig. 3.

As shown in Figs. 3 and 9, a plate 240 is secured to the side frame 61, the plate being provided with indicia 241 thereon, and a series of apertures 242. The knob 71 is splined to the cam shaft 225 and has a plate 243 secured thereto. The plate 243 is provided with a pin 244 which is adapted to fit into one of the apertures 242, and is also provided with a pointer 245 to cooperate with the indicia 241. A spring 246 is confined between an inner shoulder 247 on the knob 71 and between a plate 248 which is secured to the end of the shaft 225 by means of a screw 249. It will be seen that by manipulating the knob 71 the elevation of the shaft 206 may be regulated to a fine degree by means of the cams 226 and 227 which engage the toggle pins 218 and 219.

Means are provided to determine the initial elevation of the toggles. Levers 250 and 251 are pivoted at their forward ends on pins 252 and 253 which are mounted in guide plates 212 and 213. The toggle shaft 224 is journalled in these levers. The rear ends of these levers engage studs 254 and 255, and the position of the said rear ends is determined by the adjusting nuts 258 and 259 as shown in Fig. 7. Springs 256 and 257 surround the studs and urge the levers against the adjusting nuts so that the position of the shaft 206, and the pressure roller assembly, may be initially adjusted at the factory. Further adjustments, during operation of the machine, to compensate for different weights and thicknesses of paper stock, are determined by the knob 71 described above.

As shown in Fig. 27, horizontally disposed pins 262 and 263 are mounted on the rear frame member 264 and the studs 254 and 255 are provided at their upper ends with U-shaped blocks 260 and 261 which engage the pins 262 and 263.

It will be seen therefore that the elevation of the pressure roller 65 is primarily determined by the position of the knob 71. Inasmuch as the pressure roller is made of a resilient material, the pressure between the pressure roller and the drum will be a function of its elevation. However, the arrangement of the parts is such that if some unusual stress is introduced, as by running card stock through the machine, which is several times thicker than ordinary duplicating copy sheets, the springs 256 and 257 will take up the extra movement of the pressure roller without damaging the parts. The maximum elevation of the pressure roller is determined by the adjusting nuts 258 and 259.

It will be noted that the pressure roller 65 is not rigidly associated with the toggle or with the shaft 206, but rather is rotatably mounted thereon. Means are provided to limit the rotation of the plates 202 and 203, which means comprise studs 270 and 271 which extend inwardly from the upper toggle members 208 and 209 as shown in Fig. 22. The plates 202 and 203 are apertured as indicated at 272 and 273 so as to limit their rotation on the shaft 206. Pins 274 and 275 are provided on plates 202 and 203, and links 276 and 277 are associated with these pins and connected to the springs 278 and 279, the remote ends of which are suitably anchored to the rear frame member 264. The springs 278 and 279 urge the plates 203 and 204 in a counterclockwise direction as shown in Fig. 11 so as to withdraw the pressure roller 65 away from the drum.

Other means are provided to rotate the plates 202 and 203 against the bias of the springs 278 and 279 so as to urge the pressure roller against the drum. As shown in Figs. 22 and 23, sleeves 280 and 281 are provided on the bushings 204 and 205. Plates 282 and 283 are mounted on the sleeves 280 and 281 for a limited rotation independent of the plates 202 and 203. Rollers 288 and 289 are associated with the plates 282 and 283 by means of a telescopic shaft assembly. This telescopic shaft assembly comprises two stub shafts 284 and 285 which are received within a hollow shaft 286. Bearings 290 and 291 are provided at the outer ends of the stub shafts, and are received in the plates 282 and 283, and the rollers 288 and 289 are secured to the freely rotating stub shafts.

Hollow members 292 and 293 are threaded into the frame members 60 and 61 as shown in Figs. 23 and 24, and are adapted to receive the sliding members 74 and 75. The latter are provided with doubly flanged collars 294 and 295 which embrace the edges of small plates 296 and 297 which are secured to the plates 282 and 283. Springs 298 and 299 are concentrically disposed within the hollow threaded members 292 and 293 and urge the plate assemblies 282 and 283 inwardly. In the position of the parts as shown in Fig. 23 the rollers 288 and 289 will be forced inwardly into the solid line position as shown in Fig. 22. Pins 300 and 301 are provided in the heads of the sliding members 74 and 75 for spacing these members outwardly and for maintaining the springs 298 and 299 in a compressed condition. In this position of the parts as shown in Fig. 24, and as shown in dotted lines in Fig. 22, the doubly flanged collars 294 and 295 cause the rollers 288 and 289 to be shifted outwardly into the plane of the middle discs 144 and 159.

To operate the sliding members 74 and 75, it is necessary to raise the handle 236 from the position shown in Fig. 5 to a position wherein the toggle is broken and the shaft 206, together with the plates 202 and 203, and 282 and 283 are lowered away from the drum. In this position of the parts the sliding members 74 and 75 may be manipulated so that the rollers 288 and 289 may both be disposed either in the plane of the middle discs 144 and 159 for straight duplicating, or in the plane of the cams 310 and 311 for line printing. The handle 236 is then rotated downwardly so that the rollers 288 and 289 will engage their respective elements, and so that the pressure roller 65 will engage the drum 64. The outer ends of the hollow members 292 and 293 are apertured as indicated at 308 and 309 to receive the pins 300 and 301 so as to permit the rollers 288 and 289 to be urged inwardly into their line printing position.

Studs 302 and 303 project inwardly from plates 282 and 283 as shown in Fig. 23 and are of sufficient length so as to extend through the apertures 304 and 305 in plates 202 and 203. These studs limit the rotation of plates 282 and 283 with respect to the plates 202 and 203.

The middle discs 144 and 159 are each provided with a flat spot thereon which is shown in Fig. 25 at 307. It will be seen that the force introduced by the resilient pressure roller 65 is applied to the drum assembly both by the pressure roller 65 and by the rollers 288 and 289. This tends to cause the plates 203 and 283, as shown in Fig. 25 to spread apart, but the stud 303 limits the amount of spreading. As pointed out above, the elevation of the shaft 206 is predetermined by the knob 71. If the pressure is released from the rollers 288 and 289, the pressure between the pressure roller 65 and the drum will also be released. This will occur when the flat spot 307 on the disc 159 is rotated into registry with the roller 289. It will be seen in Fig. 7 that in this position of the parts, there is a certain amount of play in the plates 203 and 283 and the spring 279 biases these plates in a counterclockwise direction so that the pressure roller 65 is clear of the drum. The purpose of providing the flat spot is to relieve the pressure on the pressure roller when the drum is in home position. This prevents a flat spot from being formed on the resilient pressure roller during an extended period of non-use.

The printing of a single line is effected by two means. Means are provided for causing that portion of the master sheet in advance of the line which is to be printed to be blocked out. Means are also provided for releasing the pressure on the roller 65 immediately after the particular line to prevent duplication of the subsequent portion of the master sheet. The means described above whereby the pressure roller and the rollers 288 and 289 are rockingly mounted on the shaft 206 in order to cause a release of pressure during a period of non-use may also be adapted to cause the release of pressure for line printing. Additional means are employed to cause this release to take place during the period that the drum travels a very small distance. Master sheets are generally prepared on a typewriter, and a gap of approximately $\frac{1}{32}$ of an inch separates two consecutive lines. In order to insure that only one line is duplicated, it is necessary to cause the release of pressure on the pressure roller to take place while the drum and the master sheet rotate through a distance of somewhat less than $\frac{1}{32}$ of an inch.

When the sliding members 74 and 75 are in the position shown in Fig. 23, and the parts are in the full line position as shown in Fig. 22, the rollers 288 and 289 contact cams 310 and 311 which are mounted adjacent the middle discs 144 and 159. As shown in Figs. 18 and 43, bushings 312 and 313 are provided on the drum shaft 120, which bushings also serve as spacers to space inner discs 314 and 315 from the plates 154 and 155. The inner discs 314 and 315 are rotatably mounted on the bushings 312 and 313, and means are provided to adjust the angular position of the inner discs with respect to the drum. Hubs 316 and 317 are mounted on bushings 133 and 323 respectively, the hubs being rotatably associated with the inner discs 314 and 315 by studs 318 and 319 which extend through slots 320 and 321 formed in the inner discs. The cams 310 and 311 are secured to the hubs 316 and 317 so that the cams and the hubs together will have a limited rotation independent of the inner discs and independent of any other elements in the drum assembly. Slots 324 and 325 are provided in the inner discs through which the spacers 156 and 157 extend in order to permit angular adjustment of the inner discs. The shape of the cams 310 and 311 is shown in Figs. 46 and 47 and as shown therein they extend through only a fraction of the drum's periphery. They are also provided with arms to which are secured rubber blocks 326 and 327 which cooperate with the stop blocks 328 and 329 and the stop blocks 330 and 331, these blocks being secured to the inner discs 314 and 315, respectively. The blocks determine the extent of the free rotation of the cams 310 and 311.

The means by which the inner discs are adjustably associated with the drum are shown in Figs. 40 and 11 for the left and right ends of the drum assembly, respectively. Plates 332 and 333 are secured to the end plates 154 and 155 which are associated with the drum by means of studs 334 and 335. Teeth 336 and 337 are carried on a projecting portion of the plates 332 and 333. Toothed plates 338 and 339 cooperate with the teeth 336 and 337 and are associated with the inner discs. A sliding member 341 is disposed in cutout portions of the inner disc 315 and is confined to slide radially in the plane of the disc by means of plates 342 and 343. These elements are shown in Figs. 7 and 10 for the right-hand end of the drum assembly only, but it will be understood that similar elements are provided for the disc 314 at the left end. A pin 345 is secured to the sliding member 341 and carries a block 347 in which is threaded a stud 349. A spring 351 is disposed around the stud and is confined between the block and a bent-over portion 353 of the plate 343.

To adjust the angular position of the inner discs with respect to the drum, the sliding members are depressed so as to disengage the toothed plates, which are riveted to the sliding members, from the teeth 336 and 337 which are fixed with respect to the drum. The inner discs may then be rotated to the desired position, and the pressure on the sliding members released which causes the inner discs to become fixed with respect to the drum.

A kick-off roller 355 is carried on the inner disc 315, at its exterior surface as shown in Figs. 29 and 46. This roller is adapted to engage a composition roller 357 which is rotatably mounted on the plate 283 as shown in Figs. 24 and 46. Similar parts are provided for the inner disc 314 and the plate 282 at the left end of the drum assembly. The kick-off rollers engage the composition rollers to rock the plates 282 and 283 only when the sliding members 74 and 75 are in the line printing position as shown in Fig. 23.

The operation of these parts is best shown in Figs. 46 and 47, which are views showing those elements which are disposed at the right-hand end of the machine. Inasmuch as the elements at the left-hand end of the machine are the same and operate in the same manner, the operation will be described with respect to one set of elements only.

The shaft 206 may be considered as a fixed point. The extent of the force between the pressure roller assembly and the drum assembly depends on the elevation of the shaft 206. Due to the manner in which the pressure roller assembly is rockingly mounted upon the shaft 206, the force between the two assemblies is divided, and, in the operative position of the parts as shown in Fig. 6, is applied to the drum assembly at two different places; a portion is applied directly to the drum by the pressure roller 65, and a portion is applied to the cam 311 by the roller 289. As pointed out above, the object of these elements is to cause the pressure to be released from the pressure roller 65, and this is effected by causing the roller 289 to drop off the cam 311, thereby destroying the equilibrium and releasing the pressure between the two assemblies.

With high speed operation it is necessary to employ rolling friction on the cam 311 rather than sliding friction. It will be noted that the trailing edge 359 of the cam 311 is radial, and quick action can not be obtained when the cam follower is a roller, unless some over-center means is employed to accelerate the drop of the roller. For this reason both the cam 311 and the roller 289 are mounted for some play with respect to the other parts of the assembly so that after the drum has rotated the trailing edge of the cam past the center line of the roller 289, the cam may be advanced, and the roller rocked upwardly so as to cause substantially instantaneous release. When the roller 289 first engages the leading edge of the cam 311, the cam will be moved rearwardly to the limit of its motion as determined by the stop 329. As soon as the radial trailing edge 359 of the cam passes the line connecting the centers of the rollers 289 and the drum shaft 120, the cam will be advanced to the limit of its motion to permit an instantaneous drop of the roller 289.

The rocking movement of the plate 283 and the roller 289 is limited by the engagement of the stud 303 with the walls of the aperture 305 in plate 203. The plates 203 and 283 will be spread apart as the drum rotates up to the position shown in Fig. 46. When the drum reaches this point the roller 355 strikes the composition roller 357, thereby destroying the equilibrium of the forces mentioned above inasmuch as the plate 283 is caused to rock and to advance the cam 311. After the pressure has been thus released between the pressure roller assembly, and the drum assembly, the spring 279 causes the plate 203 to be rocked so as to withdraw the pressure roller from contact with the drum.

By mounting the compression roller 65 independently of the roller 357, the initial impact of the kick-off roller 355 is not directly transmitted to, nor does it otherwise affect the pressure roller 65, and the shock that would ensue if the assembly should be rocked by engagement of the kick-off roller with the pressure roller itself, is thereby obviated.

It will be seen therefore, that rotation of the drum through approximately ½ of 1°, which takes place approximately 1/600 of a second, when the drum is being rotated at sixty revolutions per minute, causes the cam 311 to be advanced with respect to the roller approximately 10°, and the positive actuation of the parts by the kick-off roller permits the pressure to be released on the pressure roller 65 practically instantaneously.

The master sheet is secured to the drum by means of gripping means which are actuated by the handle 77. As shown in Fig. 27, two longitudinal frame members 360 and 361 extend between the front frame member 362 and the rear frame member 264. A plate 363 is secured to the frame members 361 and 61, and is provided with a bent-up portion 364 which is shown in Fig. 11. A stud 365 extends through the frame member 61 and through the bent-up portion 364, and a U-shaped member 366 is pivotally mounted thereon. A bar 367 which is linked to one arm of the U-shaped member carries at its upper end a roller 368. The bent-up portion 364 is provided with a slot 369 through which a stud 370, secured to the bar 367, extends. The stud and the slot serve as a guide so that the bar 367 may slide in a substantially vertical direction when the handle 77 which is secured to the U-shaped member 366, is depressed.

A gripper shaft 371 extends through the drum and is journalled in the end members 126 and 127. A plurality of gripper arms 372 are secured to the shaft as shown in Fig. 5, and the drum is apertured so that these gripping members may extend through to the surface of the drum. The drum is provided with a transverse notch for the reception of the leading edge of a master sheet, and this notch forms a gripping surface as shown at 373 against which the grippers 372 may bear to grip the edge of the master securely to the drum. Springs 374 are confined between the small screws 375 which take into the surface of the drum and the gripper arms 372 to urge the gripper arms against the gripping surface. An actuating arm 376 is pinned to the gripper shaft 371 exteriorly of the plate 155 as shown in Fig. 11, and is disposed in the plane of the roller 368. It will be noted that the contacting surface 377 of the actuating arm does not project beyond the surface of the drum, and the inner disc 315 which is adjacent to the actuating arm is provided with a cut-away portion 378 as shown in Fig. 7. As shown in Fig. 10, the width of the roller 368 is such that it will engage either the inner disc 315 or the actuating arm. If the handle 77 is inadvertently depressed at some point in the revolution of the drum other than the position which is determined by the depression of the master changing stop handle 81, the disc 315 will prevent the roller 368 from being elevated into the path of the actuating arm 376. However, when the drum is stopped in the correct master changing position, the cut-away portion 378 of the inner disc permits the roller to engage the actuating member to open the grippers.

Means are also provided to gather the master sheet within the drum so that that portion of the master sheet immediately in advance of a predetermined line will be blocked out. The gathering device is so disposed in relation to the gripping means that that portion of the master sheet which is usually occupied by the heading will be exposed so that it may be duplicated. Means are also provided to advance the gathering means so that the master sheet will be advanced line by line for consecutive line printing.

The gathering means comprises a tumbler 380 disposed in the surface of the drum, which tumbler carries a knurled roller 381 and a series of cooperating rubber rollers 382 as shown in Fig. 5. If the master sheet is threaded between these rollers, the rollers may be advanced a slight amount between successive operations of the drum to cause the sheet to be gathered up as shown in Fig. 5. If the inner discs 314 and 315 are adjusted so that the pressure on the pressure roller 65 is released at the position shown in Figs. 46 and 47, it will be seen that by gathering the master sheet one line at a time between successive operations, successive copy sheets will each have a different line duplicated thereon.

The drum as shown in Fig. 5 is provided with inwardly extending walls 383 and 384, the surfaces of which are cylindrical with respect to the center of the tumbler. The wall 384 is provided with a slot which is of a width sufficient to accommodate the looped portion of a master sheet which has been gathered within the tumbler. The tumbler itself is formed of an upper and lower member 386 and 387 respectively which, as shown in Fig. 5, are secured together by means of studs 389. The lower member 387 is provided with a slot 388 so as to register with a slot 385 to accommodate the looped portion of a master sheet.

The tumbler is provided with sleeves 390 and 391 which are journalled in the end members of the drum, 126 and 127 so that the tumbler as a whole may be rotated from the position shown in Fig. 5 to the position shown in Fig. 25. It will be noted that the sleeve 391 terminates in a slotted portion. A shaft 392 is journalled in the sleeves 390 and 391 and the rollers 382 are mounted on this shaft. The right end of the shaft as viewed in Fig. 28 is extended beyond the sleeve and is provided at its right-hand end with a pinion 395. A plurality of housings 396 are formed in the upper member 386. A pair of friction members 397 and 399, made of a suitable plastic, are slidingly associated with each other and are slidingly disposed within each of the housings. Springs 398 engage the friction members and cause them to squeeze the shaft 392 to prevent overthrow thereof.

As shown in Figs. 29 to 34, a pivoted member 400 is mounted on the lower member 387, and is adapted to be embraced by a bifurcated member 401 in sliding relationship, an over-center spring being confined between the heads of the members 400 and 401, and surrounding the same. The lever 403 is pivotally mounted on the member 387 by means of a pin 404, and is pivoted with a bushing 405 which receives the reduced end portion 411 of the knurled roller 381. The over-center spring 402 urges the levers 403 and the knurled roller 381 into one of two positions. In its closed position, the knurled roller is urged against the rubber rollers 382, and in its open position, it is urged outwardly so that the master sheet may be threaded beneath the knurled roller 381. A pin 406 limits the outward position of the lever 403. The open position is shown in dotted lines in Fig. 31.

A hand lever 407 is pivotally mounted on the reducer portion 411, and is provided with a bent-over finger piece 408 and a bent-over portion 409 which engages the inner side of the lever 403. The lever 403 may be swung to its open position by pulling up on the finger piece 408.

In its closed position, the knurled roller 381 and its associated parts including the finger piece 408 are adapted to lie within the cylindrical surface of the drum to avoid damage to the pressure roller. In order to elevate the finger piece 408 to a position wherein it may be grasped, a plate 412 is pivoted on the shaft 392 and is provided with a knurled portion 410 which is disposed below the surface of the drum, but which may be readily engaged by the thumb to rotate the plate 412. The plate is slotted as indicated at 414, and a pin 415 mounted in the tumbler serves to limit the motion of the plate. The plate carries a pin 417 which engages the underside of the lever 407 so as to elevate the finger piece above the surface of the drum when the plate is rotated. The left end of the tumbler carries identical elements. As shown in Fig. 29, barbs 416 are provided on the tumbler adjacent the knurled portions of the roller 381. These barbs engage the master sheet and prevent it from being fed outwardly along the surface of the drum as the rollers 381 and 382 are rotated.

Means are provided to rotate the pinion 395 in order to operate the gathering device, and this means includes an internal gear 420 which is frictionally associated with the pump cam, together with means for manually rotating the gear independently of the pump cam. As shown in Fig. 18, a bushing 421 is provided on the drum shaft 120, and a hub 422 is mounted thereon for rotation with respect to the shaft. The hub is provided with a flange 423 which is engaged by the heads of a plurality of studs 424 which take into the pump cam 106. A gear wheel 425 is affixed to the hub 422 by means of rivets 426 and the gear wheel is also riveted to the internal gear wheel 420. The assembly comprising the hub 422, the internal gear 420, and the gear wheel 425 is laterally secured with respect to the pump cam by the studs 424, but independent rotation of the assembly with respect to the pump cam is permitted.

A collar 428 surrounds the shaft 120 and is affixed to the side frame 61. A plate 429 is rotatably mounted on the collar concentrically with the shaft 120, which plate is associated with the handle 79. As shown in Fig. 13 a pin 430 is mounted on the plate and a spring 431 extends between the pin and a pin 432 on the frame 61 in order to bias the handle 79 upwardly. Guide pins 433 and 434 are secured to the plate 429 and a sliding slotted member 435 cooperates therewith, this member being riveted to the handle 79. The plate 436 comprises two circular plates 610 and 611 and a semi-circular plate 612. Plate 611 fits in a circular aperture formed in the sliding member 435. Plates 610 and 612 extend beyond the plate 611 as shown in Fig. 16, and serve to hold the assembly in place. The plate 612 is disposed within the semi-circular aperture 437 and its configuration is such that it may be rotated to a small extent in either direction without affecting its sliding movement with respect to the plate 429.

The teeth 438 are so spaced from each other, as shown in Figs. 14 and 15, that one or the other of them will always be in a position to engage with the teeth of the gear wheel 425, irrespective of the angular position of the latter. It will be seen that by rotatably mounting the plate assembly 436 one or the other of the teeth 438 may at any time be caused to engage the gear wheel 425.

When the drum is locked in home position as above described, the lever 79 may be depressed into the position shown in Fig. 28 wherein the teeth 438 are engaged, and the handle may then be rotated downwardly to operate the gathering device, thereby causing the master sheet to be advanced.

Means are also provided to rotate the internal gear 420 a predetermined amount which corresponds to an advance of the master sheet by one, two or three lines. This means includes a free-wheeling device which may be alternatively engaged by the handle to cause rotation of the internal gear. The free-wheeling device comprises two rings, an inner ring 442, and an outer ring 443 adjacent thereto, these rings being slidingly and concentrically associated with the internal gear 420. A flanged ring 449 is disposed in the same plane as the ring 443, and is secured to the exterior of the internal gear. The flanged portion of the ring 449 is hardened. A plurality of fiber blocks 444 are riveted to the ring 442 and are adapted to bear against the hardened flanged portion of the ring 449 in order to space the ring 442 with respect to the internal gear. These fiber blocks also serve as a spacer for the ring 443. Plates 445 are secured to the fiber blocks and overlap both the flanger portion of the ring 449 and the outer ring 443 so that the whole assembly may be held against lateral displacement. The rings 442 and 443 do not rotate with the flanged ring, and for that reason the fiber block bearings 444 are necessary.

As shown in Fig. 17, a pin 446 is secured to the ring 443 and extends through a slot 447 of the ring 442. Another pin 448 is secured to the ring 442. A block 450 is pivotally mounted on the pin 446, and another block 451 is pivotally mounted on the pin 448. A stud 452 is threaded into the block 450 and is provided with lock nuts 453 and 454 to determine the extent of relative movement between the two rings. A spring 455 is associated with the two blocks and tends to hold the nut 453 against the lower block. This device provides a sensitive adjustment for the lost motion permitted between the rings 443 and 442.

The free-wheeling device also includes a plurality of rollers 458 which are loosely mounted on the ring 442 by means of pins 456, these rollers being adapted to cooperate with hardened steel plates 457 on the ring 443. When the ring 443 is advanced with respect to the ring 442, the rollers 458 are forced by the obliquely disposed plates 457 against the hardened surface of the ring 449, and wedged therebetween so that further rotation of the ring 443 will cause rotation of both the ring 442 and the internal gear 420. Rotation of the ring 442 in the reverse direction will loosen the rollers and will not affect the position of the internal gear. Pins 459 are mounted on the ring 442 as shown in Fig. 14, and arms 460 are pivotally mounted on the pins. The arms 460 also carry pins 461 and rollers 462. Flat springs 463 engage the pins 459 and 461 and the rollers 458. The flat springs urge the roller 462 against the inner surface of the ring 443 and serve to cause self-alignment of the ring 443 with respect to ring 442. The springs also engage the rollers 458 to maintain them out of contact with the flanged ring 449 when the free-wheeling device is inoperative. When the drum is rotating, the rings 442 and 443 are stationary, and for this reason it is desirable to maintain the rollers 458 out of contact with the ring 449.

Means are provided to rotate the ring 443 through a predetermined distance. This will cause the ring 442 to be rotated after sufficient relative movement between the two rings has taken place to cause the rollers 458 to be wedged and will result in rotating the internal gear to advance the master sheet a predetermined distance. This means includes a lug 464 on the ring 443 which is adapted to be engaged by a lever 465 on the sliding member 435. The lever is pivoted at 466 and a spring 467 extends between a pin 468 on the lever and a pin 469 on the sliding member 435.

When the lever 79 is depressed and then rotated, the teeth 438 engage the gear 425 and rotate the same as above described. If the lever 79 is rotated downwardly without depressing the same, the lever 465 engages the lug 464, and the rotation of the lever is transmitted to the internal gear through the free-wheeling device as above described.

A plate 470 is secured to the ring 442 and carries thereon a stop pin 471. A spring 472 extends between a pin 473 on the plate 470 and a pin 474 on a frame plate 485, associated with the frame 61 by means of spacers 486, in order to bias the ring 442 in a clockwise direction as viewed in Fig. 13. A block 475 is secured to the plate 485 and carries an adjusting screw 476 which determines the lower position of the stop pin 471.

A shaft 477 extends through the frame 61 and the plate 485, and a pointer 478 is associated with the knob 73 and cooperates with a dial plate 479 which is provided with indicia. The dial plate is secured to the exterior surface of the frame 61 and is apertured to receive a pin 480 which is mounted on the knob 73. As shown in Fig. 18, a spring 481 biases the shaft inwardly so that the pin 480 will serve to hold the shaft in any one of three predetermined positions. A cam plate 483 is pinned to the shaft 477 by means of a hub 482, and is provided with a series of three notches. It will be seen that when the pointer 478 is set to one of the three positions as shown in Fig. 13, that the stop pin 471 will engage the notch and limit the movement of the ring 442 and the handle 79 to advance the master sheet a predetermined amount.

Means are also provided to rotate the tumbler 380 which is journalled in the drum so that the gathering device will be turned inwardly, and a smooth cylinder surface will be presented so that the duplicating device may be used for straight duplicating. As shown in Figs. 18 and 28, an axially displaceable sleeve 490 is positioned on the shaft 392 and is provided with projections at the left end to cooperate with the slotted portion of the sleeve 391. A clutch element 491 is pinned to the sleeve 490, and a cooperating toothed clutch element 492 is pinned to the shaft 392 to the right of the clutch element 491. A spring 493 urges the clutch elements into disengaged position, and a disc 494 is secured to the clutch element 491 to limit the axial displacement of the sleeve into disengaged position, the disc being adapted to engage the middle disc 159. When the sleeve 490 is displaced against the action of the spring 493, it will be seen that rotation of internal gear 420 by means of the handle 79 will rotate the tumbler.

Figure 8:
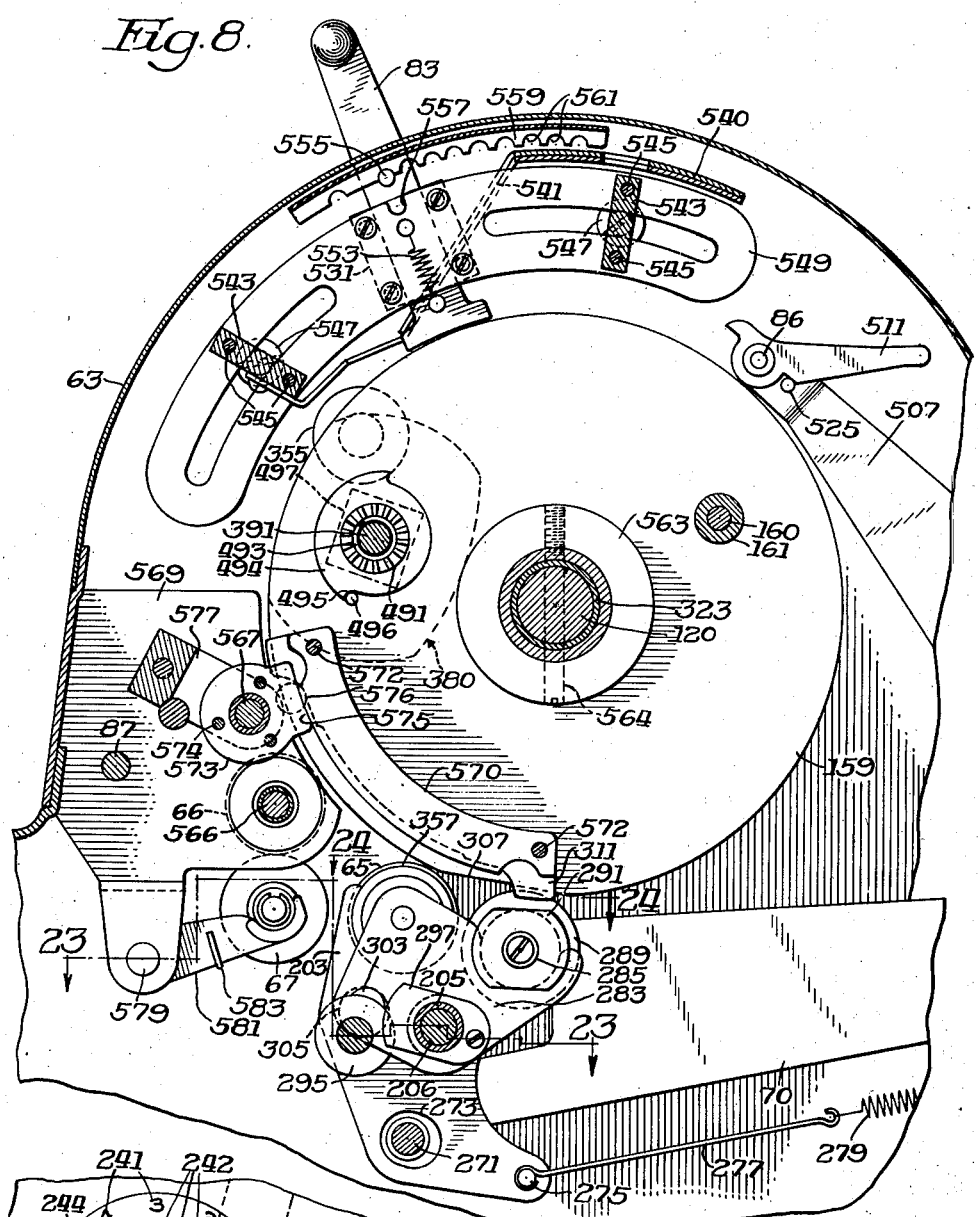
Fig. 8 is a section taken along line 8—8 of Fig. 3.

The disc 494 is cut-away as shown at 495, and a pin 496 is secured to the middle disc 159 to limit the rotation of the tumbler to 180°, as shown in Fig. 8.

Means are also provided to displace the sleeve 490 so that the tumbler may be rotated. A block 497 is mounted in a square aperture in the middle disc 159 and bears against the disc 494. A sleeve cam 498 is secured to the block 497 and surrounds the sleeve 490. A sleeve 501 surrounds the sleeve 490 and terminates in a cooperating sleeve cam so that when this sleeve is rotated, as shown in Fig. 28 the clutch members 491 and 492 will be engaged.

A sleeve 500 is provided at the left-hand end of the tumbler, which sleeve is rotatably mounted on the shaft 392, and confined in position by a washer 394 and a screw 393 which takes into the end of the shaft 392.

Frame plates 506 and 507 are secured to the frame members 60 and 61, respectively, by means of spacers 508 and 509. The shaft 86 is journalled in the upper portion of the frame plates and is provided at either end with arms 510 and 511. A knurled member 512 is also provided on the shaft 86 to facilitate its rotation. The arms 510 and 511 are adapted to be rotated from the position shown in Fig. 11, wherein they bear against the stop pins 524 and 525, into the dotted line position wherein they extend into the path of projections 504 and 505 of disc 502 and 503 as shown in Figs. 40 and 11, respectively, in order to cause the discs to be rotated.

Figure 12:
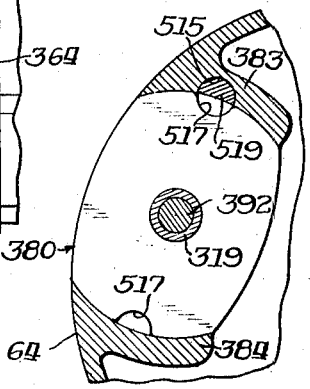
Fig. 12 is a section taken along line 12—12 of Fig. 28.

The inwardly extending wall 384 is provided with a semi-cylindrical cut-away portion 514 at its left end as shown in Fig. 41, and a similar cut-away portion is provided at the right end of the wall 383 as shown in Fig. 12, these cut-away portions also being shown in Fig. 28. The tumbler 380 is provided at its left end with two corresponding cut-away portions 516, and with two corresponding cut-away portions 517 at its right end. Indexing pins 518 and 519 are journalled in the end members 126 and 127, and are provided with semi cylindrical ends which are adapted to be rotated from their positions in the cut-away portions 514 and 515, into the corresponding cut-away portions in the tumbler in order to lock it either in the line printing position or in the straight duplicating position.

Pinions 520 and 521 are secured to the indexing pins, and these pinions mesh with gear wheels 522 and 523 which are secured to the sleeves 500 and 501. Springs 526 and 527 are anchored on pins 528 and 529 in the end members 126 and 127 and engage the indexing pins to bias them into operative position wherein they lock the tumbler.

The discs 502 and 503 are secured to the gears 522 and 523 so that when the drum is manually rotated backwardly, the discs will be rotated and cause the indexing pins to be rotated to their inoperative position. At the same time the rotation of the disc 503 will cause the sleeve 501 to be rotated so as to cause the clutch element 491 to be displaced into engagement with the clutch element 492 by means of the sleeve cam. When this has been done, the tumbler is free to rotate, and the tumbler may be rotated by means of the lever 79 to a sufficient extent to rotate the tumbler 180°. When the tumbler is to be rotated, the lever is depressed so that the gear 420 is rotated directly. This method of rotating the internal gear is intended primarily for reversal of the tumbler, whereas the alternative method is provided solely for the purpose of advancing the master sheet. However, when the master sheet is to be advanced a considerable distance, it may be preferable to use the first described method.

Means are provided to adjust the position of the inner discs 314 and 315 with respect to the drum so as to change the position of the kick-off device. The manual controls for this adjustment are slidingly mounted on a frame 530. As shown in Fig. 3, the frame is mounted at its right end on the collar 428, and at its lever end on a similar collar 531 which is provided with an annular shoulder. These collars 428 and 531 are secured to the frame members 61 and 60, respectively. A ring-shaped plate 532 is secured to the collar 531 by means of one or more studs 533 so as to frictionally engage one of the vertically disposed supporting members 534 and 535 of the frame 530. It will thus be seen that the frame 530 may be rotated bodily about the collars. The vertical supporting members are provided with arcuate longitudinal members 536 and 537 which are secured thereto by the studs 538 and 539. A cross member 540 connects the arcuate members 536 and 537, and the cross member is provided with a downwardly sloping forward portion 541, as shown in Fig. 5, which portion serves as a guide for a master sheet as it is being changed.

Pairs of blocks 542 and 543 are secured to the arcuate members 536 and 537 by means of screws 544 and 545, and guiding studs 546 and 547 taken into these blocks. Slotted arcuate members 548 and 549 are slidingly mounted on the guide studs 546 and 547. These slotted members carry blocks 550 and 551 thereon which are slotted to permit the handles 82 and 83 to be slidingly mounted therein. The handles are disposed in the same plane as the inner discs 314 and 315. Springs 552 and 553 are provided to bias the handles upwardly out of engagement with the inner discs. The handles carry pins 554 and 555 which are adapted to engage notches 556 and 557 formed in the slotted arcuate members 548 and 549 when the handles are depressed.

Plates 558 and 559 are secured to the arcuate longitudinal members 536 and 537, and these plates carry series of notches 560 and 561 for the pins 554 and 555. As shown in Figs. 7 and 10, when the handle 83 is depressed, it will engage the sliding member 341 to disengage the inner disc 315 from the drum. Handle 82 is operated in the same way. The handle may then be rotated to adjust the positions of the inner discs with respect to the drum, and when released, they are urged by the springs 552 and 553 into the notches, so that the position of each handle as determined by the proper notch always corresponds to the position of the sliding member 341 when the drum is in home position. Adjustment of the handles 82 and 83 determines the number of lines selected in the selective printing operation as shown in Fig. 46, by means of causing the toothed plate 339 to engage the tooth 337 at a predetermined position. In the notch numbered 1, only the first line will be printed as shown in Fig. 49. If the handles are adjusted so that the notch numbered 5 is engaged by the tooth, the first five lines will be printed as shown in Fig. 50. If notch H is engaged, only the heading will be printed.

Manual means are also provided for adjusting the position of the end disc 135 with respect to the middle disc 144 so that the home position of the drum may be changed with respect to the drum shaft. The interrupted gear 99 which drives the feed rollers 66 and 67 is affixed to the drum shaft so that by moving backwardly the home position of the drum, the copy sheet will be advanced with respect to the master sheet. In this way, lines may be printed on the master sheet at a position below the position of lines that have previously been printed thereon when the home position of the drum is in its normal advanced position.

As shown in Fig. 20, a hub 563 is mounted on the bushing 323, and the hub is pinned to the drum shaft by the pin 564. The interrupted gear 99 is provided with a dwell portion 565, and is suitably secured to the hub 563. The interrupted gear is apertured for the stud and spacer 160 and 161 so that the position of the drum may be shifted with respect to the interrupted gear. The upper feed roller 66 is mounted on a shaft 566, which shaft 566 is journalled in plates 568 and 569 which are secured to the frame members 60 and 61.

Two cams are carried by the interrupted gear, a decelerating cam 570 and an accelerating cam 571 which are secured thereto by means of rivets 572. A plate 573 is secured to the idler gear 100 by means of suitable rivets 574, the plate being provided with a flat portion 575 for cooperation with the decelerating cam 570, and carrying a roller 576 for cooperation with the accelerating cam 571. The idler gear 100 and its associated parts are mounted on a short shaft 567 which is journalled in a U-shaped member 577 as shown in Fig. 8, which member is bolted to the plate 569. The feed rollers are driven through the gears 100 and 101 with an intermittent motion by means of the interrupted gear 99, which is secured to the drum shaft. The decelerating cam 570 and the plate 573 cooperate to prevent overthrow of the feed rollers at the beginning of the dwell period, and the accelerating cam 571 and the roller 576 cooperate to initiate the motion of the feed rollers so as to avoid the clashing of gears. The cooperation of these parts is more fully described in Morrison Patent No. 2,220,264, issued November 5, 1940.

A shaft 579 is journalled in the frame member 60 and the plate 569, and the knob 89 is splined thereto. The arms 580 and 581, in which the lower feed roller 67 is journalled, are rotatably mounted on the shaft 579. Springs 582 and 583 bias the arms upwardly, one end of the springs being secured to the arms. The other end of the spring 582 is secured to a cotter pin 584 in the shaft 579, and like means is provided for the spring 583. A plate 586 is secured to the frame member 60 as shown in Fig. 26, the plate being provided with a series of apertures 587 and indicia thereon. A pin 588 is secured to the knob 89 which cooperates with the apertures 587 to hold the shaft in a predetermined angular position. The pointer 589 which is secured to the knob 89 cooperates with the indicia on the plate 586 to indicate the extent to which the springs 582 and 583 are tensioned, and the degree of pressure with which the lower feed roller 67 is urged against the upper feed roller 66. A suitable spring is provided to bias the pin 588 into one of the apertures 587.

The frame 530 is provided with means which engage the member 147 so that the position of the drum and its associated parts may be shifted with respect to the drum shaft and the interrupted gear 99, thereby causing the copy sheet to be positioned differently with respect to the drum. As indicated above, the frame 530 is rotatably mounted with respect to the drum shaft so that the position of the handles 82 and 83 will remain the same with respect to the inner discs 314 and 315. Consequently no matter how the drum and the frame are shifted with respect to the drum shaft, the handles are always in registry with the sliding members 340 and 341.

A slotted block 590 is provided at the forward end of the longitudinal arcuate member 536, the arms of the slotted block embracing the end portion of the member 536 and being suitably affixed thereto. A cylindrical member 591 is disposed in a slotted portion of the backspacer handle 80, and the block is drilled to receive the same in sliding relationship. A pin is mounted in the cylindrical member 591 and cooperates with notches 593 in the block 590 as shown in Figs. 42 and 43 to determine the extent to which the handle 80 may be depressed. A spring 594 is anchored to a pin 595 on the slotted block 590 and engages the pin 592 to urge the handle forwardly. The lower portion of the hand controlled member 80 is provided with a projection 596 which is adapted to engage a notch 597 in the sliding plate 147.

When the back spacing handle 80 is manually depressed against the bias of the spring 594, it will engage the sliding member 147 and cause the toothed elements to be disengaged, thereby permitting the frame and the drum assembly to be rotated as a unit to the extent desired.

Additional means are provided to trip the drum, or to move the stop members 173 and 174 out of the path of the pawl 139. This means includes a trip shaft 87 which is suitably journalled in the plates 568 and 569, and which carries at its left-hand end an arm 601 which engages a pin 602 on the lever 184 as shown in Figs. 35 and 42. A pin 603 is carried on a lower projecting portion of the plate 429 and is adapted to engage a link 604 which is slotted as shown at 607 for the guide pin 605, mounted on the frame member 61. The link 604 is linked to an arm 606 secured to the trip shaft 87. Rotation of the trip shaft 87 by means of elevating the master sheet advancing handle 79 to the dotted line position shown in Fig. 13 will have the same effect as depressing the trip button 78. Consequently, when the machine is being operated for consecutive line printing, the handle 79 may be depressed after the drum has come to rest in order to advance the master sheet, and the handle may then be elevated to trip the machine for another operation.

The operation of the duplicating machine has been described in detail above in connection with the operation of the various groups of parts thereof. The operation of the machine as a whole will here be described.

It may be assumed that the parts of the machine are in position for straight duplicating, and that a master sheet in the form of an invoice has been secured to the drum. A copy sheet disposed on the tray 68 may be manually advanced into the bight of the feed rollers 66 and 67 when they are stationary. The trip button 78 is then depressed which causes a complete copy of the invoice to be duplicated upon the copy sheet. In order to duplicate only a portion of the invoice, the master sheet must be removed from the drum, and certain parts of the machine shifted over into their line printing position.

The motor is shut off, and the pressure roller assembly is lowered away from the drum by raising the lever 236. The shifting knobs 74 and 75 are then rotated to permit them to be displaced inwardly into line printing position wherein the rollers 288 and 289 are disposed in the plane of the cams 310 and 311 respectively, and the composition rollers 356 and 357 are disposed in the plane of the kick-off rollers 354 and 355. The lever 236 is then lowered in order to elevate the supporting shaft 206 and bring the pressure roller 65 and its associated elements into operative position.

Before the master sheet is removed, the stop handle 81 is depressed, and the drum then rotated into master changing position. The gripper handle 77 is then depressed to open the grippers and the master sheet removed from the drum.

The shaft 86 is then rotated by means of the knurled thumb piece 512 so as to bring the arms 510 and 511 into forwardly extending position. The trip button 78 is then depressed and the drum rotated backwardly by means of the hand-wheel 76, the motor being shut off. Displacement of the projections 504 and 505 by the arms 510 and 511 will cause the indexing pins 518 and 519 to be released, and will also cause the clutch elements 491 and 492 to become engaged. The drum is held in this position while the handle 79 is depressed so that the teeth 438 engage the gear wheel 426. Subsequent rotation of the handle 79 downwardly will reverse the tumbler so that the gathering device is exposed on the surface of the drum. The drum is then rotated forwardly into the master sheet changing position to permit the indexing pins to return to their operative position, due to the action of the springs 526 and 527, and to permit the clutch elements to become disengaged due to the action of the coil spring 493.

The gathering device is then opened, that is the knurled roller 381 is swung outwardly and the master sheet is then inserted between the knurled roller and the drum, and the leading edge thereof is secured in the grippers 372. The knurled roller 381 is swung outwardly by means of the finger piece 408, which may be elevated in the grasping position by rotating the knurled plate 412. After the knurled roller 381 is swung back into its operative position so that the master sheet is gripped between the rollers 381 and 382, the position of the master sheet can be adjusted by depressing and rotating the handle 79 so that the first line on the master sheet below the heading is disposed in the position as shown in Fig. 46.

In order to selectively print the heading and the first line of the master sheet onto a copy sheet as shown in Fig. 49, the handles 82 and 83 are adjusted so that the notch numbered 1 on each of the toothed plates 338 and 339 engages the teeth 336 and 337 respectively, as shown in Figs. 46 and 47. In this position the kick-off rollers 354 and 355 will cause the rollers 288 and 289 to kick off the cams 310 and 311 so that the pressure on the pressure roller 65 will be released immediately after the first line of the master sheet has passed between the bight of the pressure roller and the drum.

To print five lines on a copy sheet as shown in Fig. 50, the handles 82 and 83 are adjusted so that the pressure roller will be released after the fifth line has been duplicated. Similarly the apparatus may be adjusted so that just the heading or any given number of lines may be selected by causing the corresponding notch in the plates 338 and 339 to engage the teeth 336 and 337.

In the operation of consecutive line printing, the apparatus is adjusted as above described in connection with Fig. 49, so that just the heading and a single line will be duplicated. The pointer 478 is then set opposite the number 6 on its corresponding dial, by means of turning the knob 73 in order to determine the extent to which the master sheet may be advanced with respect to the drum. The number 6 represents one-sixth of an inch, which corresponds to the spacing between the lines of a master sheet which are made on a typewriter. Between each duplicating operation, the handle 79 is depressed to actuate the gathering device so as to advance the master sheet one line, and the next operation is then initiated by raising the handle 79 to trip the drum. Successive copy sheets will have duplicated on them the heading and a single line in consecutive order, as shown in Figs. 49 and 51.

If it is desired to duplicate consecutive pairs of lines or if the lines on the master sheet are double-spaced, the pointer 478 is set opposite the figure 3 as shown in Figs. 1 and 19, which indicates that the master sheet is advanced one-third of an inch or two lines between each operation.

In selective printing, if it is desired to print five lines as shown in Fig. 50, but which lines are the fifth to the ninth, inclusive, of the master sheet, after the handles 82 and 83 have been adjusted for five lines, the pointer 478 is set to the 3 position, and the handle 79 is then actuated twice to advance the master to the proper position. The master may be advanced any desired number of lines by the use of the stop means which are controlled by the knob 73.

In the collective printing operation, it is desired to print on a copy sheet certain selected lines, such as those shown in Fig. 52, wherein the second, fourth, sixth, and eighth lines of the master sheet are duplicated on the copy sheet in closely spaced relationship. The handles 82 and 83 are adjusted so that the heading and the first line will be printed on the copy sheet as shown in Figs. 46 and 47. The lever 79 is then advanced so that the second line of the copy sheet comes into printing position, and the copy sheet is then fed through the apparatus so that the heading and the second line are printed thereon.

The knurled roller 381 is then swung outwardly and the grippers released so that the leading edge of the copy sheet may be inserted into the slotted portions 385 and 388 into the position shown in Fig. 45. After the knurled roller 381 has been returned to its operative position, the position of the master sheet is adjusted with respect to the drum by manipulation of the handle 79 so that the line numbered 4 will be the next line to be printed.

The drum is then shifted backwardly with respect to the drum shaft 120 so that the next line to be printed, that is line four, will be printed on the copy sheet immediately below the previously printed line. The position of the copy sheet with respect to the shaft is determined by positioning the leading edge of the copy sheet against the bight of the feeding rollers; shifting the drum backwardly has the effect of causing the copy sheet to be fed into printing engagement in an advanced position with respect to the drum. This adjustment is effected by depressing the back spacer handle 80 to disengage the toothed elements 145 and 151. The drum and the handle 80 may then be rotated backwardly to the extent of one line. The spacing of the teeth on the toothed elements corresponds to the desired spacing of the lines on the copy sheet.

After the same copy sheet has been fed through the apparatus so that line 4 has been duplicated thereon in the desired position, the master sheet is advanced two more lines by manipulation of the handle 79. The drum is shifted backwardly one line so that the line numbered 6 will be duplicated in the third position on the copy sheet. The same operations are repeated for the other lines to be duplicated.

If desired, the heading may first be printed separately by having the plate 339 engaged in the notch H, and then picking up all the lines separately. This involves an extra feeding operation, but uniformity of spacing between the lines of the copy sheet may be more easily obtained.

Various combinations of lines can obviously be duplicated by means of this apparatus, other than those shown in Figs. 49 to 52, but the essential operations are the same as those above described.

It is understood that although only one preferred embodiment of my invention has been shown and described herein, that various modifications and changes may be made therein, and that various changes in the size, shape, and proportion of the parts may be made without departing from the spirit of my invention. The drawings and the above description are only illustrative and my invention is to be limited only by the appended claims.

I claim:

1. A method of collectively printing a plurality of selected lines of a master sheet on a copy sheet by means of a device for printing only a single line of the master sheet which comprises the steps of positioning the master sheet between successive printing operations with respect to the line printing device so that a different selected line will be printed each time, feeding a copy sheet to said device a plurality of times, and advancing the position of the copy sheet with respect to the line to be printed during each succeeding feeding step.

2. A method of collectively printing certain lines of a master sheet which is partially disposed on the surface of a drum and partially disposed within a slotted portion of the drum which comprises the steps of duplicating the single line thereof, which is immediately adjacent said slotted portion, onto said copy sheet, advancing the master sheet to bring another line adjacent said slotted portion, and again feeding said copy sheet into printing relationship with said drum in an advanved position so that the second line will be duplicated beneath the first line.

3. A method of collectively printing certain lines of a master sheet associated with a rotatable drum by means of bringing a copy sheet into printing relationship with said drum only at a predetermined portion of the drum's surface so that only the single line of said master sheet which overlies said portion will be printed on said copy sheet which comprises the steps of successively feeding a copy sheet into printing relationship with said drum a plurality of times, advancing the master sheet between successive printing operations to bring another line into printing relationship with respect to said drum, and advancing said copy sheet with respect to said drum during the successive feeding operation so that the successive lines will be duplicated beneath the preceding lines.

4. In a duplicating device including a drum and a cooperating pressure roller, means to adjustably secure a master sheet with respect to said drum so that a portion thereof is disposed on the surface of the drum, and an adjacent portion beneath said surface, means to urge said pressure roller against said drum, means to advance said master sheet along said drum with respect to the point where said pressure roller first engages said master sheet, means operative at a predetermined point in the rotation of the drum to release the pressure which said pressure roller exerts against said drum, adjusting means to regulate the location of said predetermined position, and means to shift the position of said copy sheet with respect to said drum.

5. A duplicating machine comprising a drum, a pressure roller coacting therewith, and a gathering device disposed on the surface of said drum for blocking out a portion of a master sheet secured to said drum intermediate the ends of said master sheet, said gathering device being pivotally mounted in said drum whereby it may be rotated beneath the surface of said drum when not in use.

6. In a duplicating machine provided with a drum and a coacting pressure roll, a gathering device comprising a roller mounted just below the surface of said drum, a second roller engaging the same, means for resiliently urging said rollers into pressure relationship with each other, means for rotating said rollers to shift the position of a master sheet overlying said drum, cooperating friction members oppositely disposed with respect to the periphery of one of said rollers, and means to urge said friction members toward each other so as to squeeze said last mentioned roller to prevent overthrow thereof, said friction members being slidably mounted in nonrotatable relationship with respect to said gathering device.

7. In a duplicating machine comprising a drum provided with a slotted portion, a roller mounted in said slotted portion beneath the surface of said drum, a second roller engaging the same in pressure relationship, and means for rotating said rollers when said drum is stationary, said means including a manually operated lever, a free-wheeling device disposed between said rollers and said manually operated lever to cause rotation of said rollers in one direction only, and means to limit the rotation of said free-wheeling device to a predetermined extent.

8. In a duplicating machine provided with a drum and a coating pressure roller, a gathering device comprising a roller mounted just below the surface of said drum, a second roller engaging the same, means for urging said rollers into pressure relationship with each other, the shaft for said second roller being extended beyond said drum and being provided with a pinion, an internal gear frictionally associated with said drum and meshing with said pinion, and means for rotating said internal gear with respect to said drum, said means including a manually operated lever provided with means to rotate said internal gear directly, a free-wheeling device associated with said internal gear, said manually operated lever being alternatively adapted to engage said free-wheeling device to cause rotation of said internal gear in one direction only, and means to limit the rotation of said free-wheeling device to a predetermined extent.

9. In a line printing duplicating apparatus provided with a drum and a gathering device disposed in the surface thereof, means to actuate said gathering device comprising a pinion associated therewith, an internal gear engaging said pinion, said internal gear being frictionally associated with said drum so as to rotate therewith, but being adapted to be rotated independently of said drum, two rings disposed concentrically and exteriorly of said internal gear, rollers carried on one of said rings and extending between the other of said rings and said internal gear, means on said second ring for engaging said rollers and wedging them against said internal gear when said second ring is rotated with respect to said first ring to cause said internal gear and said first ring to be rotated with said second ring, and manual means for rotating said second ring.

10. In a line printing duplicating apparatus provided with a frame, a drum rotatably mounted with respect to said frame, and a gathering device disposed in the surface thereof, means to actuate said gathering device comprising a manually actuated lever pivotally mounted with respect to said frame, a rotatable clutch member concentrically mounted with respect to said lever and geared to said gathering device and provided with a hardened surface, a carrier member concentrically and independently mounted with respect thereto and biased into a stop position, a third member concentrically and independently mounted with respect to said carrier member, a lost motion connection between said third member and said carrier member, said third member being associated with said lever for rotation thereby, rollers carried on said carrier member and extending between said third member and said clutch member, means on said third member for engaging said rollers and wedging them against said hardened surface when said third member is rotated with respect to said carrier member to cause said clutch member to be rotated, means biasing said rollers away from said hardened surface, and adjustable means to limit the rotation of said carrier member from said stop position to a predetermined amount.

11. In a line printing duplicating apparatus provided with a frame, a drum and a gathering device disposed in the surface thereof, means to actuate said gathering device comprising a lever pivotally mounted with respect to said frame, a free-wheeling device concentrically mounted with respect thereto and including a clutch element, a carrier element, and an actuating element, said carrier element and said actuating element being in the form of two rings disposed concentrically and exteriorly of said clutch element, said clutch element being operatively associated with said gathering device by means including an element rotatably mounted with respect to said drum, and said actuating element being operatively associated with said lever, rollers carried by said carrier element and disposed between said actuating element and said clutch element and being adapted to be displaced by the former and wedged against the latter upon manual actuation of said lever to cause rotation of the latter and actuation of said gathering device, means biasing said free-wheeling device to an inoperative stop position, and means including a rotatably mounted adjustable plate extending into the path of said free-wheeling device to determine the extent to which said gathering device is actuated.

12. A duplicating machine comprising a drum having a shaft, a pressure roller for cooperation therewith, and means to maintain and to release the pressure between said pressure roller and said drum during the duplicating operation, said means comprising a cam associated with said drum, a cooperating follower associated with said pressure roller, and supporting means for maintaining said pressure roller and said follower in predetermined positions wherein they bear against said drum and said cam respectively to introduce a predetermined stress between said drum shaft and said supporting means and their associated parts during a portion of the drum's revolution, said pressure roller and said follower being rockingly mounted about said supporting means as a common center so as to cause the stress between the parts to be released when said follower drops off said cam.

13. Duplicating apparatus comprising a drum, a pressure roller, a supporting member for said pressure roller, adjustable means for holding said supporting member in a predetermined position with respect to said drum, said pressure roller being rockingly mounted on said supporting member, a cam associated with said drum, a cooperating cam follower associated with said pressure roller, and means for rockingly mounting said cam follower on said supporting member and for limiting to a predetermined maximum the angular position of said cam follower with respect to said pressure roller, the parts being so arranged that they are stressed under a pressure determined by the position of said supporting member, said cam being provided with a drop surface whereby the pressure on said pressure roller may be released when said follower drops off said cam.

14. A duplicating apparatus comprising a drum, a pressure roller, a supporting member for said pressure roller, means for holding said pressure roller against said drum, said pressure roller being rockingly mounted on said supporting member, a cam associated with said drum, and a cam follower non-yieldingly associated with said pressure roller, whereby the pressure on said pressure roller may be released when said follower drops off said cam, and means for causing said follower to drop off of said cam and to be completely disengaged therefrom while the drum rotates through a distance which is substantially less than that distance through which it would ordinarily be required to rotate to effect complete disengagement.

15. Duplicating apparatus including a drum, a pressure roller, supporting means for said pressure roller, said pressure roller being pivotally mounted with respect to said supporting means, and two cooperating control elements being associated with said drum and said pressure roller respectively in such a manner that during one portion of the drum's revolution, the control element associated with said drum displaces the second control element to rock said pressure roller against said drum and to maintain the parts in stressed relationship, and during a subsequent portion of the drum's revolution, the latter displaces the former to permit said pressure roller to drop away from said drum.

16. Duplicating apparatus comprising a drum, a pressure roller therefor, a cam associated with said drum and being mounted thereon for free rotation of a limited extent with respect thereto, a cam follower associated with said pressure roller and adapted to be engaged by said cam to hold said pressure roller against said drum, and means for rocking said cam follower against said freely mounted cam in order to cause said follower to advance said cam with respect to said drum to accelerate the drop of said follower after said drum has been rotated through a predetermined position.

17. A duplicating apparatus comprising a drum, a pressure roller therefor, a cam associated with said drum and being mounted thereon for free rotation of a limited extent with respect thereto, a cam follower associated with said pressure roller and adapted to react against said cam to maintain an equilibrium of forces which serves to hold said pressure roller against said drum, means for imparting an additional force to said cam follower to cause said freely mounted cam to shift its position with respect to said follower thereby destroying said equilibrium, and means to bias said pressure roller away from said drum.

18. A duplicating apparatus comprising a drum, a pressure roller therefor, a cam associated with said drum and being mounted thereon for free rotation of a limited extent with respect thereto, a cam follower associated with said pressure roller for limited movement with respect thereto and adapted to be engaged by said cam to hold said pressure roller against said drum, and means for positively displacing said cam follower, independently of said pressure roller, against the trailing edge of said freely mounted cam in order to advance said cam with respect to the drum whereby said pressure roller may drop to inoperative position.

19. A duplicating machine comprising a drum, a cam associated therewith for limited rotation with respect thereto, a pressure roller for said drum, a cam follower for cooperation with said cam rockingly mounted for a limited amount of play with respect to said pressure roller and adapted to maintain said pressure roller in pressure engagement with said drum, and means on said drum to rock said follower inwardly so as to displace said cam out of the path of said follower whereby the pressure between said pressure roller and said drum will be released.

20. A duplicating machine comprising a drum, a cam having a drop surface associated with said drum for a limited rotation with respect thereto, a resilient pressure roller for said drum, a supporting member for said pressure roller, a cam follower for cooperation with said cam rockingly mounted on said supporting member for limited rotation with respect to the axis of said pressure roller, means on said drum to rock said follower against said drop surface of said cam so as to displace said cam out of the path of said follower, and means for adjustably maintaining the position of said supporting member with respect to said drum so that after said follower has dropped off said cam the pressure between said resilient pressure roller and said drum will be released.

21. A duplicating machine comprising a drum and a cam associated therewith, for a limited rotation with respect thereto, a resilient pressure roller for said drum, a supporting member for said pressure roller, a cam follower for cooperation with said cam to maintain said pressure roller in contact with said drum and mounted on said supporting member for limited rotation with respect to the axis of said pressure roller, means on said drum to cause said follower to displace said cam out of the path of said follower while said pressure roller is maintained in contact with said drum, and means for preventing displacement of said supporting member toward said drum after said follower has dropped off said cam.

22. A duplicating machine comprising a frame, a rotatable drum, a pressure roller for cooperation therewith, a supporting member for said pressure roller, a toggle for adjustably mounting said supporting member with respect to said frame, stop means mounted on said frame for limiting the motion of said toggle in its extended direction, and means for adjusting the position of said stop means with respect to said frame whereby the position of said supporting member may be determined.

23. A duplicating apparatus comprising a drum, a pressure roller for cooperation therewith, non-yielding means for maintaining said pressure roller in a fixed position wherein said pressure roller and said drum are stressed one against the other to produce a printing pressure, the degree of which pressure is determined by said fixed position, cam means associated with said drum to cause said position maintaining means to be released at a predetermined point in the drum's revolution, and means to adjust the angular position of said cam means with respect to said drum in order to regulate the number of lines to be duplicated from a master sheet secured to said drum onto a copy sheet.

24. A duplicating apparatus comprising a frame, a drum journalled therein, means to rotate said drum and to stop the same in a predetermined home position, a pressure roller for coperation therewith, means for urging said pressure roller against said drum, cam means associated with said drum for angular adjustment with respect thereto to cause the pressure between said pressure roller and said drum to be released at a predetermined point in the drum's revolution, a radially sliding member associated with said cam, cooperating toothed elements secured respectively to said drum and to said sliding member, means biasing said member toward the periphery of said cam and biasing said toothed elements into engagement with each other whereby the angular position of said cam with respect to said drum may be fixed in one of several positions, a notched plate associated with said frame whereof the angular spacing of the notches corresponds to the angular spacing of the teeth of said toothed elements when said drum is stopped in home position, a manually operated adjusting handle slidingly associated with said frame and provided with a pin for engaging one of the notches of said notched plate to determine the angular disposition of said handle with respect to said frame, and a spring for urging said handle outwardly and said pin into engagement with said notched plate, said handle being adapted to be depressed into engagement with said sliding member when said drum has been stopped in its home position and to be rotated to adjust the angular position of said cam with respect to said drum, and said notched plate being adapted to maintain said handle in registry with said sliding member when said drum is again stopped in home position.

25. In combination with a duplicating apparatus provided with a frame and a drum assembly journalled therein, said drum assembly comprising a shaft, and a plurality of elements including a drum mounted on said shaft in axially spaced relationship, means for adjusting the angular position of one of the elements of said drum assembly with respect to a second element adjacent to said first mentioned element, said means comprising a member slidingly associated with said first mentioned element and constrained to slide in a radial direction, cooperating toothed members secured respectively to said sliding member and to said second mentioned element, resilient means to urge said toothed members into engagement with each other to determine the angular position of said elements, and a handle slidingly associated with said frame for engaging said sliding member to depress the same against the action of said resilient means, and to rotate said first mentioned element with respect to said second mentioned element.

26. In combination with a duplicating apparatus provided with a frame, a drum assembly journalled therein, said drum assembly comprising a shaft, and a plurality of elements mounted on said shaft in axially spaced relationship, and means to rotate said drum assembly and to stop it in a predetermined home position, means for adjusting the angular position of one of the elements of said drum assembly with respect to a second element positioned adjacent thereto, said means comprising a member slidingly associated with said first mentioned element and constrained to slide in a radial direction, cooperating toothed members secured respectively to said sliding member and to said second mentioned element, resilient means to urge said toothed members into engagement with each other to determine the angular position of said elements, a handle slidingly associated with said frame for engaging said sliding member to depress the same against the action of said resilient means, and to rotate said first mentioned element with respect to said second mentioned element, means to bias said handle away from said sliding member, and means to maintain said handle in its adjusted angular position wherein it is disposed in registry with said sliding member when said drum assembly is subsequently stopped in home position to facilitate a subsequent adjustment.

27. A duplicating machine comprising a frame, a shaft rotatably mounted in said frame, a drum adjustably mounted on said shaft, means to rotate said shaft and to stop the same automatically in a predetermined home position after each duplicating cycle, feed rollers geared to said shaft and adapted, when said shaft is stopped in home position, to position the leading edge of a copy sheet with respect to said drum, a pressure roller mounted for cooperation with said drum, and a cam adjustably mounted with respect to said drum for regulating the coaction of said pressure roller with said drum so as to duplicate only a portion of a master sheet secured to said drum onto a copy sheet which has been positioned and fed by said feed rollers to said drum, said portion being duplicated onto said copy sheet at a position which may be predetermined by the angular adjustment of said drum with respect to said shaft.

28. A duplicating machine comprising a frame, a shaft rotatably mounted in said frame, means to rotate said shaft and to stop the same automatically in a predetermined home position after each duplicating cycle, a drum adjustably mounted on said shaft, a master sheet gathering device disposed in the surface of said drum, a pressure roller mounted for cooperation with said drum, a cam associated with said drum for regulating the coaction of said pressure roller with said drum, means for adjusting the angular position of said cam with respect to said drum in order to duplicate only a portion of a master sheet exposed on the surface of said drum, and means rotating with said drum and adapted when said drum is in home position to be manually rotated to actuate said sheet gathering device in order to expose a predetermined portion of said master sheet for duplication.

29. A duplicating machine comprising a frame, a shaft rotatably mounted in said frame, means to rotate said shaft and to stop the same automatically after a single rotation in predetermined position after each printing cycle, a feed roller drive gear associated with said shaft, a drum associated with said shaft, a sheet gathering device disposed in the surface of said drum to expose on said surface only certain lines of a master sheet for duplication, a pressure roller mounted for cooperation with said drum, a cam associated with said drum for regulating the coaction of said pressure roller with said drum, and means associated with said drum to actuate said sheet gathering device, means to adjust the angular position of said last named means with respect to said drum to determine the number of lines exposed, means to adjust the angular position of said cam with respect to said drum to determine the number of exposed lines to be duplicated, and means to adjust the angular position of said feed roller drive gear with respect to said drum to determine the position of the duplicated lines on a copy sheet.

30. A duplicating apparatus comprising a frame, a drum, a coacting pressure roller, means to regulate the cooperation of said pressure roller with said drum so as to duplicate only a portion of a master sheet secured to said drum, a shaft for said drum rotatably mounted on said frame, means to rotate said shaft, means to cause said shaft to be automatically stopped and locked in a predetermined position after each printing cycle, feeding rollers disposed adjacent the bight of said drum and said pressure roller, means on said shaft to actuate the said feeding rollers in timed relationship with respect to said shaft whereby a copy sheet may be fed into engagement with said drum at a predetermined point, and means to adjust the angular position of said drum with respect to said shaft and said feeding roller actuating means to cause said portion of said master sheet to be duplicated at a predetermined position on said copy sheet.

31. A duplicating apparatus comprising a frame, a drum, a coacting pressure roller, a cam associated with said drum to regulate the cooperation of said pressure roller with said drum so as to duplicate only a portion of a master sheet secured to said drum, a shaft for said drum rotatably mounted on said frame, means to rotate said shaft, means to cause said shaft to be automatically stopped in a predetermined position after each printing cycle, feeding rollers disposed adjacent the bight of said drum and said pressure roller, means on said shaft to actuate the said feeding rollers in timed relationship with respect to said shaft whereby a copy sheet may be fed into engagement with said drum at a predetermined point, means to adjust the angular position of said drum with respect to said shaft to cause said portion of said master sheet to be duplicated at a predetermined position on said copy sheet, and means to adjust the angular position of said cam with respect to said drum.

32. A duplicating apparatus comprising a frame, a drum, a coacting pressure roller, means to adjustably secure a master sheet to said drum so as to expose for duplication only a portion of said master sheet, a shaft for said drum rotatably mounted on said frame, means to rotate said shaft, means to cause said shaft to be automatically stopped and locked in a predetermined position after each printing cycle, feeding rollers disposed adjacent the bight of said drum and said pressure roller, means on said shaft to actuate the said feeding rollers in timed relationship with respect to said shaft whereby a copy sheet may be fed into engagement with said drum at a predetermined point, and means to adjust the angular position of said drum with respect to said shaft to cause said portion of said master sheet to be duplicated at a predetermined position on said copy sheet.

33. A duplicating apparatus comprising a frame, a drum, a coacting pressure roller, means to regulate the cooperation of said pressure roller with said drum and a gathering device associated with said drum whereby only a portion of a master sheet associated with said drum may be selected for duplication, a shaft for said drum rotatably mounted on said frame, means to rotate said shaft, means to cause said shaft to be automatically stopped in a predetermined position after each printing cycle, feeding rollers disposed adjacent the bight of said drum and said pressure roller, means on said shaft to actuate the said feeding rollers in timed relationship with respect to said shaft whereby a copy sheet, after being positioned against said feed rollers when said shaft is stopped, may be fed into engagement with said drum, and means to adjust the angular position of said drum with respect to said shaft to cause said selected portion of said master sheet to be duplicated at a predetermined position on said copy sheet.

34. Duplicating apparatus adapted alternatively for selective line printing and for straight duplicating comprising a drum, a coacting pressure roller, two cams on said drum, one cam being provided for causing said pressure roller to be maintained in a predetermined position wherein said pressure roller exerts a predetermined pressure against said drum during a predetermined portion of the drum's rotation only after which the pressure on said pressure roller is released, and the other cam being provided for causing said pressure roller to be maintained in said predetermined position against said drum for substantially a complete revolution of said drum, a follower associated with said pressure roller for cooperating with one or the other of said cams, and means to shift said follower axially in order that the whole of a master sheet may be duplicated, or only a portion thereof.

35. Duplicating apparatus adapted alternatively for selective line printing and for straight duplicating comprising a drum, a coacting pressure roller, a tumbler rotatably mounted in said drum and being provided with a master sheet gathering device, and means to rotate said tumbler into either one of two positions, whereby in one of which positions said gathering device is disposed on the surface of said drum for line printing, and in the other of which positions, a cylindrical surface coincides with the surface of said drum for straight duplicating.

36. Duplicating apparatus adapted alternatively for selective line printing and for straight duplicating comprising a drum, a coacting pressure roller, two sets of cams on said drum, one set being provided for causing said pressure roller to be urged against said drum during a predetermined portion of the drum's rotation only and the other set of cams being provided for causing said pressure roller to be urged against said drum for substantially a complete revolution of said drum, a set of cam followers associated with said pressure roller for cooperating with one or the other of said sets of cams, means to shift said follower axially in order that the whole of a master sheet may be duplicated, or only a portion thereof, a tumbler mounted in said drum and being provided with a master sheet gathering device, and means to lock said tumbler in either one of two positions, in one of which positions said gathering device is disposed on the surface of said drum for line printing operation, and in the other of which positions, a cylindrical surface coincides with the surface of said drum for straight duplicating operation.

37. Duplicating apparatus adapted alternatively for selective line printing and for straight duplicating comprising a drum, a coacting pressure roller, a tumbler mounted in said drum and being provided with a master sheet gathering device, means to lock said tumbler in either one of two positions of which in one position said gathering device is disposed on the surface of said drum for line printing operation, and in the other position, a cylindrical surface coincides with the surface of said drum for straight duplicating operation, manual means to rotate said tumbler, clutch means disposed between said manual means and said tumbler, and means for releasing said locking means and for engaging said clutch means whereby said tumbler may be rotated by said manual means.

38. In a wet process duplicating machine, a drum provided with a reversible tumbler for use in straight duplicating or in line printing operations, an indexing pin for locking said tumbler in straight duplicating or line printing positions, means biasing said indexing pin into locked position, a manually rotatable member for reversing said tumbler, clutch means connecting said tumbler to said manually rotatable member, resilient means urging said clutch means into disengage position, a projection associated with said indexing pin and with a portion of said clutch means and extending away from said drum, and a member extending into the path of said projection and adapted to actuate the same when said drum is rotated in a reversed direction to release said indexing pin and to cause engagement of said clutch to permit subsequent rotation of said tumbler by said manually rotatable member.

39. A duplicating machine comprising a frame, a rotatable drum, a resilient pressure roller mounted adjacent to said drum, a lever pivoted on said frame, means connecting said pressure roller with said lever to maintain said pressure roller in a predetermined operative position wherein said pressure roller exerts a predetermined pressure against said drum, means for regulating the effective length of said connecting means, and resilient means to urge said lever in a direction wherein the pressure roller would be pressed against said drum, and means to limit the displacement of said lever so that it will be maintained in a predetermined position corresponding to said predetermined position of said pressure roller, said predetermined pressure being independent of the pressure exerted on said lever by said resilient means.

40. A duplicating machine comprising a rotatable drum, a pressure roller for cooperation with said drum, toggle means associated with said pressure roller to determine the elevation thereof with respect to said drum, a resilient mounting on which the lower leg of said toggle means is pivoted, and stationary stop means to limit the action of said resilient mounting so that in normal operation of the duplicating machine, the elevation of said toggle means as a whole will remain fixed.

41. A duplicating machine comprising a frame, a rotatable drum, a pressure roller for cooperation therewith, means for maintaining said pressure roller in a predetermined operative position wherein it exerts a predetermined pressure against said drum, said means including a toggle, adjustable means for limiting the motion of said toggle in its extended direction, resilient means to maintain said toggle in contact with said adjustable means, and a resilient mounting for said toggle, the effective force required to flex said toggle against the bias of said resilient means on said toggle being greater than the effective force required to displace said resilient mounting, whereby unduly large stresses caused by the introduction of heavier paper stock between said pressure roller and said rotatable drum will cause said toggle to be displaced bodily without flexing said toggle.

42. A duplicating machine comprising a drum shaft, a second shaft spaced therefrom, a drum mounted on said drum shaft, means to secure a master sheet to said drum, a pressure roller spaced from said second shaft and pivotally mounted thereon for movement toward and away from the surface of said drum, and non-yielding means actuated by the rotation of said drum for rotating the axis of said pressure roller into a predetermined position wherein said pressure roller exerts a pressure against the surface of said drum during a predetermined portion of the drum's revolution, whereby only a portion of the master sheet is duplicated.

43. A duplicating machine comprising a drum shaft, a second shaft spaced therefrom, a drum mounted on said drum shaft, means to secure a master sheet to said drum, a pressure roller spaced from said second shaft, means for pivotally mounting said pressure roller about said second shaft as a center whereby movement of said pressure roller against the surface of said drum will stress said second shaft, and non-yielding means actuated by the rotation of said drum for causing movement of said pressure roller toward and away from the surface of said drum, whereby duplicating pressure between said pressure roller and said drum is maintained during a predetermined portion of the drum's revolution and is terminated by the release of the stress on said second shaft.

44. A duplicating machine comprising a drum shaft, a second shaft spaced therefrom, a drum mounted on said drum shaft, means to secure a master sheet to said drum, a pressure roller spaced from said second shaft and mounted thereon for movement toward and away from the surface of said drum, non-yielding means actuated by the rotation of said drum for bringing the axis of said pressure roller into a predetermined position wherein said pressure roller exerts a pressure against the surface of said drum during a predetermined portion of the drum's revolution, and means to regulate the position of said second shaft with respect to said drum shaft so as to change said predetermined position whereby the pressure exerted by said pressure roller against the surface of said drum in said predetermined position may be regulated.

45. A duplicating machine comprising a drum shaft, a second shaft spaced therefrom, a drum mounted on said drum shaft, a pressure roller spaced from said second shaft, means for pivotally mounting said pressure roller about said second shaft as a center whereby movement of said pressure roller against the surface of said drum will stress said second shaft, non-yielding means controlled by the rotation of said drum for causing movement of said pressure roller into stressed position and for releasing the stress thereon, and means for withdrawing said pressure roller from contact with the surface of said drum after said stress has been released.

46. A duplicating machine comprising a drum shaft, a second shaft spaced therefrom, a drum and a cam mounted on said drum shaft for rotation therewith, a pressure roll, a cam follower, and non-yielding means for mounting said pressure roll and said cam follower about said second shaft as a center so that when said cam follower is engaged by said cam said pressure roller will be rotated toward the surface of said drum and into a predetermined position with respect to said surface.

ELI WILDERSON.